United States Patent [19]

Moreno

[11] Patent Number: 5,162,783

[45] Date of Patent: Nov. 10, 1992

[54] INFRARED TOUCH SCREEN DEVICE FOR A VIDEO MONITOR

[75] Inventor: Mario Moreno, Durham, N.C.

[73] Assignee: Akzo N.V., Netherlands

[21] Appl. No.: 627,229

[22] Filed: Dec. 14, 1990

Related U.S. Application Data

[63] Continuation-in-part of Ser. No. 556,098, Jul. 23, 1990, abandoned.

[51] Int. Cl.$^5$ .............................................. G09G 3/02
[52] U.S. Cl. .................................. 340/712; 340/706; 341/31
[58] Field of Search ................. 340/706, 709, 712; 341/31; 250/221; 718/18, 19

[56] References Cited

U.S. PATENT DOCUMENTS

| | | | |
|---|---|---|---|
| 4,413,314 | 11/1983 | Slater et al. | 340/712 |
| 4,678,558 | 6/1987 | Beckes et al. | 340/712 |
| 4,695,827 | 9/1987 | Beining et al. | 341/31 |
| 4,737,631 | 4/1988 | Sasaki et al. | 250/221 |
| 4,812,830 | 3/1989 | Doering | 341/31 |
| 4,841,141 | 6/1989 | Ouchi | 250/221 |
| 4,893,120 | 1/1990 | Doering et al. | 340/712 |
| 4,904,857 | 2/1990 | Ando et al. | 340/712 |

Primary Examiner—Ulysses Weldon
Assistant Examiner—Doon Yue Chow

[57] ABSTRACT

An infrared touch screen device that is externally adaptable to a video monitor for serving as an input device to a computer connected to the monitor. A bezel is adapted to be releasably secured over a viewing end of a video monitor. A plurality of infrared emitters are disposed along the bezel to form a grid of vertical and horizontal infrared beams in the interior space of the bezel when the emitters are activated. A plurality of infrared sensors are disposed along the bezel. Each sensor is optically aligned with an oppositely disposed one of the emitters. An activating circuit is mounted on the bezel for sequentially activating, in a predetermined sequence, respective ones of the emitters. A scanning circuit is mounted on the bezel for sequentially scanning the sensors in a sequence corresponding to the predetermined sequence, the sensors each producing output signals corresponding to the presence and absence, respectively of an infrared beam emitted by an oppositely disposed infrared emitter. A communication device couples the output signals of the sensors to an input port of a computer connected to the monitor.

29 Claims, 24 Drawing Sheets

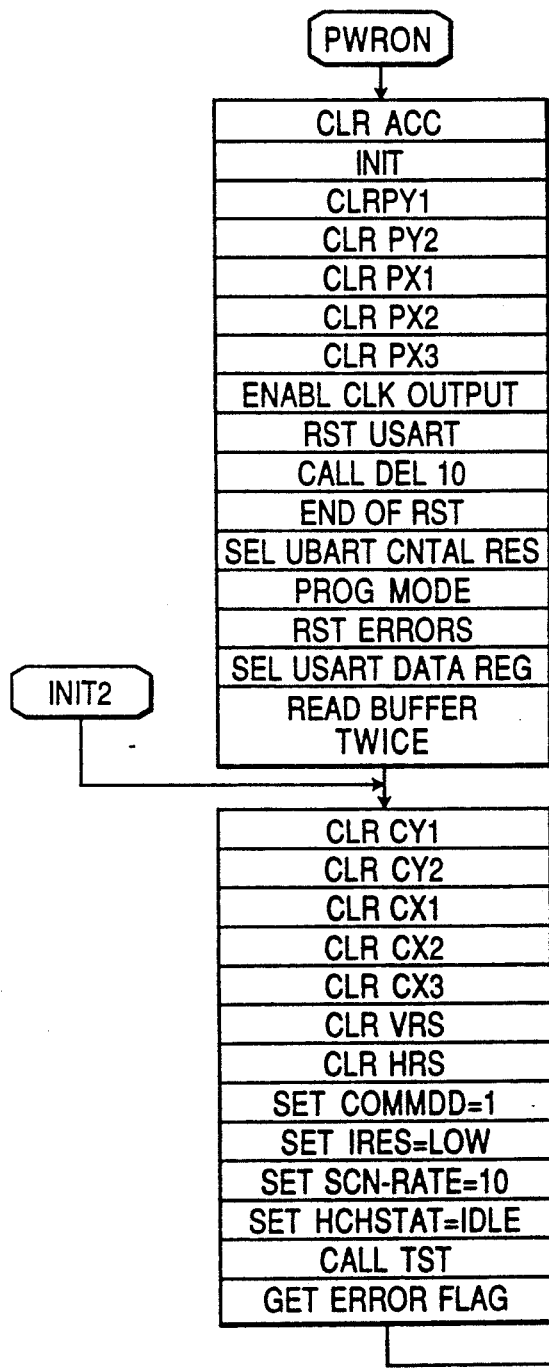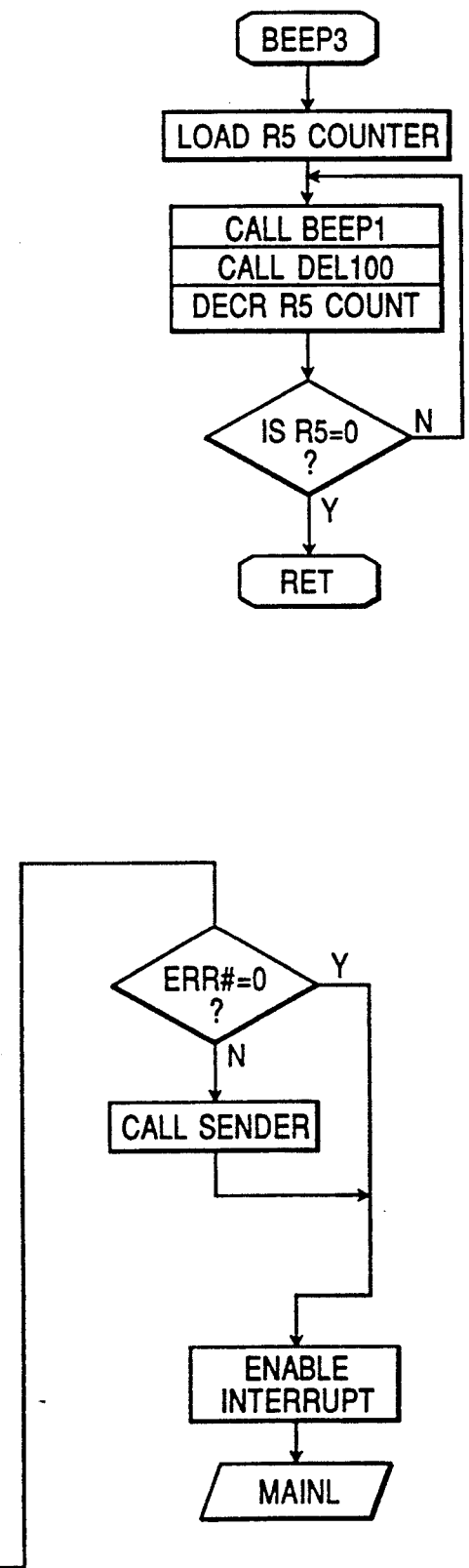
FIG. 10A-2
FIG. 10A-5

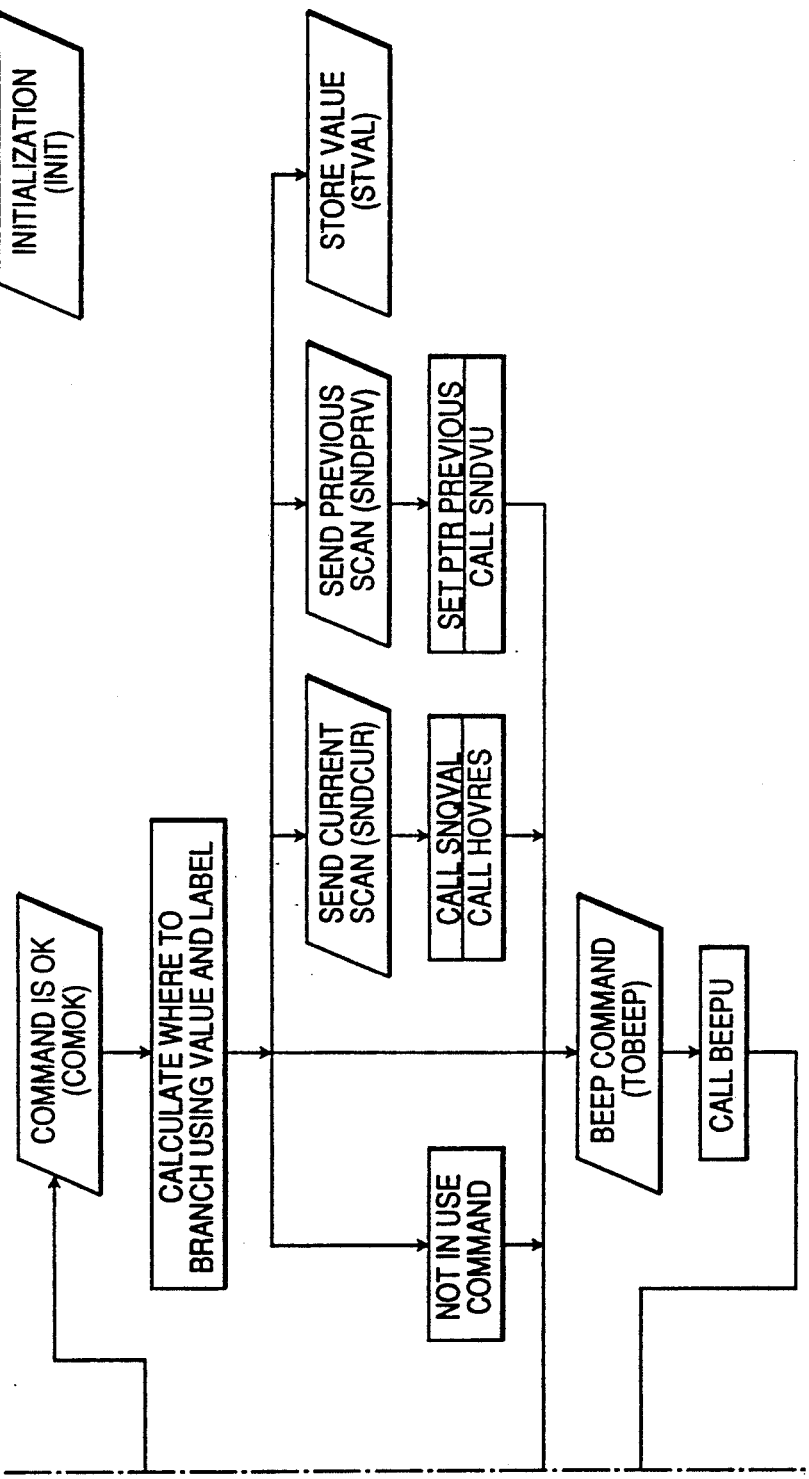

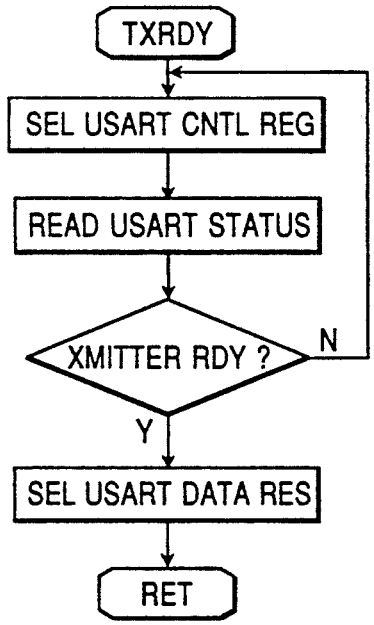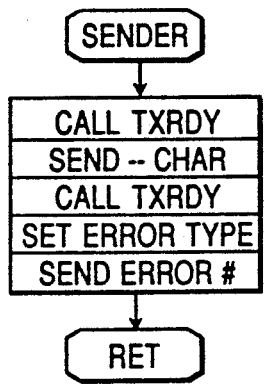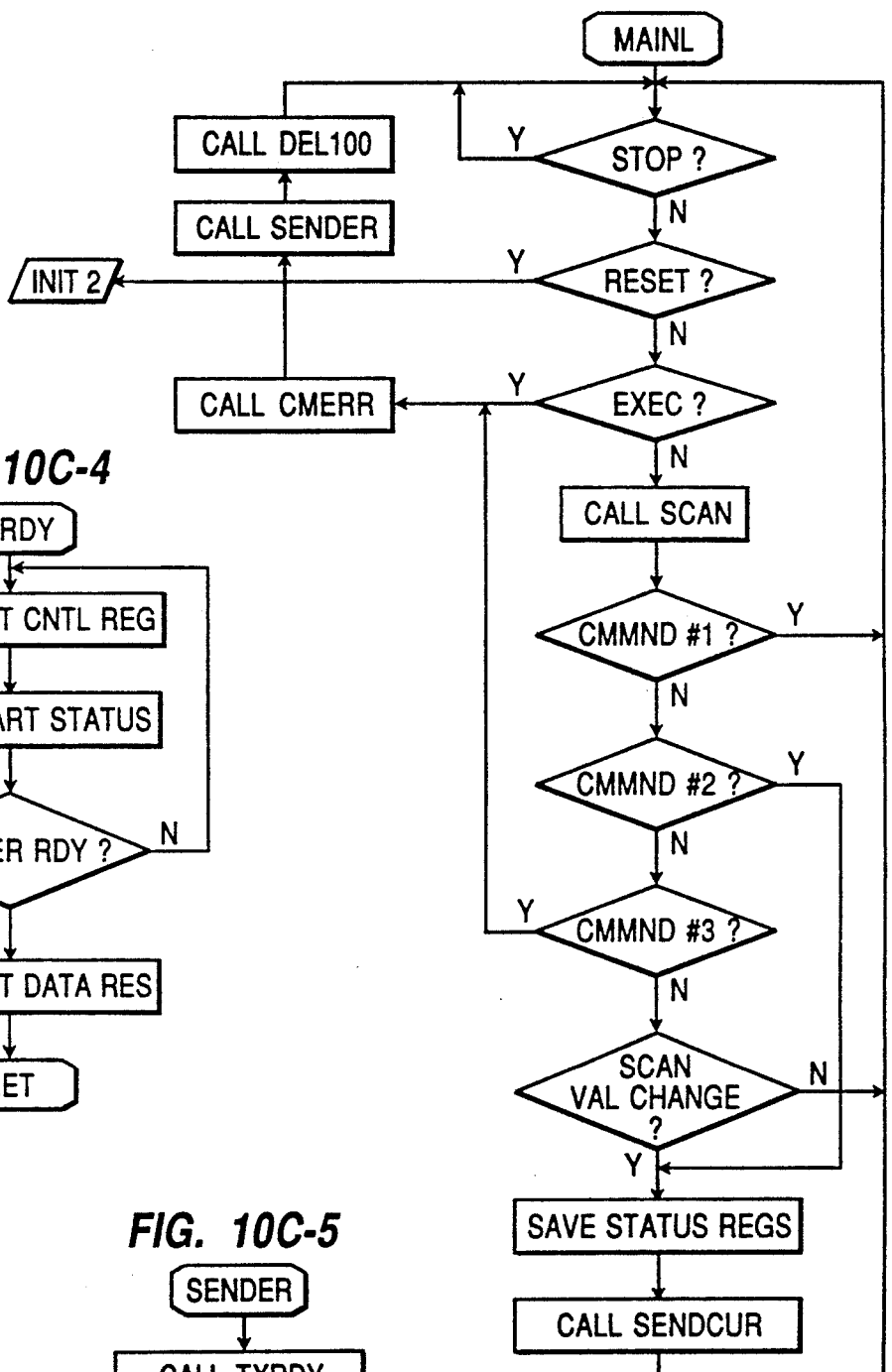

INFRARED TOUCH SCREEN DEVICE FOR A VIDEO MONITOR

This is a continuation-in-part of application Ser. No. 07/556,098, filed Jul. 23, 1990, now abandoned.

BACKGROUND OF THE INVENTION

The present invention relates to an input device for a computer, and more particularly to an infrared (IR) touch screen for a video monitor that serves as a computer input device.

Infrared touch screens are known which utilize vertical and horizontal arrays of IR emitters and sensors disposed about the rim of the screen of a video monitor to form a grid of IR beams superposed in a plane over the screen of the monitor. The emitters are sequentially activated and opposing sensors are likewise scanned for sensing the presence or absence of an IR beams from the respective opposing emitters. When a pointed object or finger is placed near the screen of the monitor, thereby blocking vertical and horizontal IR beams, the position of the object in the grid is detected by the output of the X-Y sensors that are optically aligned with the blocked beams.

In known IR touch screens, the IR emitters and sensors and the hardware associated therewith for driving the emitters and scanning the sensors are built into the video monitor or retrofitted internally into the monitor. This requires either specially manufacturing a touch screen monitor, which is obviously expensive for both the manufacturer and consumer, or opening up a monitor to retrofit the touch screen optoelectronics which poses the danger of damaging internal components of the monitor, again an undesirable consequence for the consumer/user. It therefore would be desirable to have a relatively inexpensive IR touch screen device that could be externally adapted to a wide variety of video monitors for serving as an input device to a computer by simply plugging the device into the serial input port of the computer, similar to known mouse or joy stick input devices. Such an externally adaptable touch screen device could be massed produced relatively inexpensively and selectively applied to a user's monitor without risking damage to internal components of the monitor.

Further, IR touch screens that have been developed so far suffer from a relatively low resolution and slow response time. Generally speaking, overall resolution of an IR touch screen is limited by the physical size of the IR emitter-sensor pair devices. The smallest known devices of this type force a limit to the grid dimension on the order of 0.25 inches. Even if smaller emitter-sensor pairs were available to reduce the grid dimensions and thereby increase the resolution of the touch screen, the required overall scanning time would be undesirably increased due to the increased number of sensing elements that would need to be scanned and due to the fact that the scanning time is fixed for each element. It would therefore be advantageous if the resolution of an IR touch screen could be increased without decreasing the scanning speed, and if possible, to increase the resolution simultaneously with an increase in scanning speed.

Additionally, in known IR touch screens, there exists an aberrational error known as parallax due to the curvature of the screen and the normal human arm and finger mechanics, causing IR beams to the side or above or below the intended pointing location to be blocked, thereby designating an incorrect location on the screen. This problem is more pronounced at the corners of the touch screen. It would be desirable to devise a touch screen to minimize the parallax problem.

A further problem with known IR touch screens has to do with signal to noise ratio of the IR sensors which are sensitive to broad band light. The signal to noise ratio can be degraded by the variable ambient light conditions in which the touch screens may be operated. A related problem concerns the fact that the infrared emitters emit infrared light which is projected over a relatively wide angle so that the infrared light actually illuminates a number of oppositely disposed infrared sensors. Similarly, the infrared sensors have a relatively wide viewing angle and thus can sense the infrared light projected by a number of oppositely disposed infrared emitters. The output of a sensor is thus unintentionally raised by infrared light from emitters on either side of the optically aligned emitter which, combined with a low signal to noise ratio could, result in an erroneous output.

SUMMARY OF THE INVENTION

It is an object of the present invention to provide a touch screen device which is externally adaptable to a wide variety of computer monitors for use as a computer input device.

It is a further object of the present invention to provide a high resolution, fast response time touch screen for use as a computer input device.

It is yet another object of the invention to provide a touch screen device that minimizes the problems discussed above.

The above and other objects are accomplished according to the invention by the provision of an infrared touch screen device that is externally adaptable to a video monitor for serving as an input device to a computer connected to the monitor, including: a bezel adapted to be releasably secured over a viewing end of a video monitor, the bezel defining an opening through which a screen of a monitor to which the bezel is attached can be viewed; a planar transparent screen secured to the bezel and covering the opening; infrared beam generating means mounted on the bezel for generating a grid of infrared beams adjacent the planar transparent screen on a side of the planar transparent screen remote from a screen of a video monitor to which the bezel is to be attached; sensing means mounted on the bezel for sensing the presence and absence of respective beams in the grid and producing output signals corresponding to the presence and absence, respectively, of the infrared beams; and communication means for communicating the output signals of the sensing means to a computer connected to the monitor to which the bezel is attached.

According to another embodiment of the invention there is provided an infrared touch screen device that is externally adaptable to a video monitor for serving as an input device to a computer connected to the monitor, including: a bezel adapted to be to be releasably secured over a viewing end of a video monitor, the bezel defining an interior space through which a screen of a monitor to which the bezel is attached can be viewed; a plurality of infrared emitters disposed along the bezel to form a grid of vertical and horizontal infrared beams in the interior space when the emitters are activated; a plurality of infrared sensors disposed along the bezel, each sensor being optically aligned with an oppositely disposed one of the emitters; activating means mounted on the bezel for sequentially activating, in a predetermined sequence, respective ones of the emitters; scanning means mounted on the bezel for sequentially scanning the sensors in a sequence corresponding to the predetermined sequence, the sensors each producing output signals corresponding to the presence and absence, respectively, of infrared light emitted by an oppositely disposed infrared emitter; and communication means for coupling the output signals of the sensors to an input port of a computer connected to the monitor.

Thus, the IR touch screen device according to the invention is an externally adaptable module that requires no internal modification to an already manufactured video monitor. Further, according to one aspect of the invention a planar transparent screen is disposed in the interior space of the bezel thereby eliminating the parallax error previously discussed. According to yet another aspect of the invention an infrared passband filter is disposed on the inner edge of the bezel so that the emitted IR beams pass through the filter prior to entering the interior space of the bezel and pass through the filter again upon exiting the interior space prior to being sensed by a sensor, thereby minimizing the effect of ambient light conditions and increasing the signal to noise ratio of the sensor output. The signal to noise ratio is further increase according to another aspect of the invention which employs a unique activating and scanning sequence whereby the viewing angle of a sensor that is being scanned is outside of the projection angle of the next emitter in the sequence that is simultaneously turned on. Therefore each sensor senses only the IR light from its optically aligned emitter, further increasing the signal to noise ratio of the sensor output. In yet another aspect of the invention the resolution of the IR touch screen is increased by effectively doubling the number of IR beams, without increasing the number of emitter/sensor pairs. This is accomplished by a processing technique that adds virtual beams to the IR beam grid. By determining the midpoint between two blocked IR beams and converting the midpoint to a coordinate, a virtual IR beam is created between every two real beams, thus doubling the resolution.

According to another embodiment of the invention there is provided an infrared touch screen for a video monitor for serving as an input device to a computer connected to the monitor, the monitor having a viewing screen and a bezel surrounding the screen and defining an interior space through which the screen can be viewed, including: a plurality of infrared emitters disposed along the bezel to form a grid of vertical and horizontal infrared beams in the interior space when the emitters are activated by an activating current; a plurality of infrared sensors disposed along the bezel, each sensor being optically aligned with an oppositely disposed one of the emitters; activating means for sequentially activating, in a predetermined sequence, respective ones of the emitters, the activating means including means for passing an activating current through respective ones of the emitters in the predetermined sequence; scanning means for sequentially scanning the sensors in a sequence corresponding to the predetermined sequence, the sensors each producing output signals corresponding to the presence and absence, respectively, of an infrared beam emitted by an oppositely disposed infrared emitter, the corresponding sequence by which the scanning means scans the oppositely disposed sensors lagging the predetermined sequence by a predetermined time delay; and communication means for coupling the output signals of the sensors to an input of a computer connected to the monitor.

The IR touch screen device according to this embodiment of the invention takes advantage of the fact that the infrared emitters, when activated by an activating current, emit infrared light which builds, essentially exponentially, in intensity to a maximum and when turned off (that is the activating current is interrupted), the intensity of the light dies down, also essentially in an exponential manner. A fast response time (i.e. fast scanning) is obtained by scanning each IR sensor just after the light from its oppositely disposed IR emitter is turned off, while simultaneously the next IR emitter in the sequence is activated. Thus, while the next IR emitter is turning on, the IR beam from the previously activated IR emitter is being sensed by its optically aligned sensor. The IR emitter turn-on time is thereby effectively eliminated from the scanning time, since it is not necessary to have a time delay built into the scanning sequence to accommodate the turn-on time of each emitter. In effect, the scanning sequence of the sensors lags behind the activating sequence of the emitters by one IR beam.

The touch screen apparatus according to the invention thus significantly increases resolution, has an unparalleled fast response time, is unaffected by ambient light, and advantageously can be totally external to the video monitor that is used.

Other features and advantages will become apparent from the following detailed description when considered in conjunction with the accompanying drawings.

BRIEF DESCRIPTION OF THE DRAWINGS

FIGS. 7A-1 to 7A-2, 7B-1 to 7B-2 and 7C-1 to 7C-4 are circuit schematics of the electronics shown in the block circuit diagram of FIG. 6.

FIGS. 10A-1 to 10A-7 10B-1A to 10B-1B, 10B-2 and 10C-1 to 10C-5 are flow charts for a computer program for operating the microcontroller shown in FIGS. 7A-1 to 7C-4 according to a preferred embodiment of the invention.

DETAILED DESCRIPTION OF A PREFERRED EMBODIMENT

Figure 1:
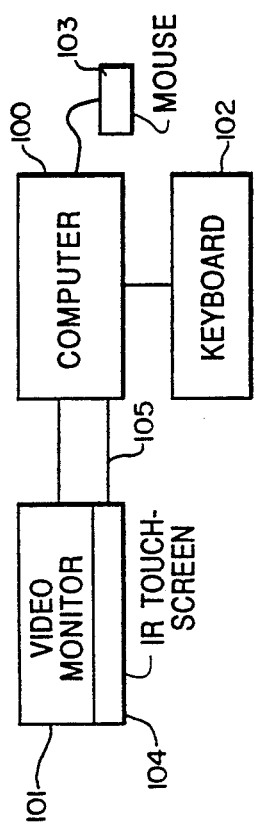
FIG. 1 is a block circuit diagram showing a system employing an externally adaptable touch screen device according to the invention.

Referring to FIG. 1, there is shown a computer 100 connected to a monitor 101, such as a VGA monitor, and to several input devices, including a keyboard 102, a mouse 103 and a touch screen device 104, the latter being the subject of the present invention. Touch screen devices are generally known. Basically, it is an interactive computer input device which allows the user to input a command to the computer by placing an object, such as a pointer or the user's finger on or near the screen of the monitor to select a command graphically displayed on the monitor. Previously known touch screen devices were built into the monitor itself during manufacture or internally retrofitted into the monitor. The present invention involves, in one embodiment, an externally adaptable touch screen device which can be used with a wide variety of monitors as will become clear from the following description. Additionally, certain principles of operation of the touch screen device according to the invention can be incorporated into a touch screen device built internally into a monitor for achieving greater resolution and higher scanning speeds as will further become clear from the following description.

Figure 2:
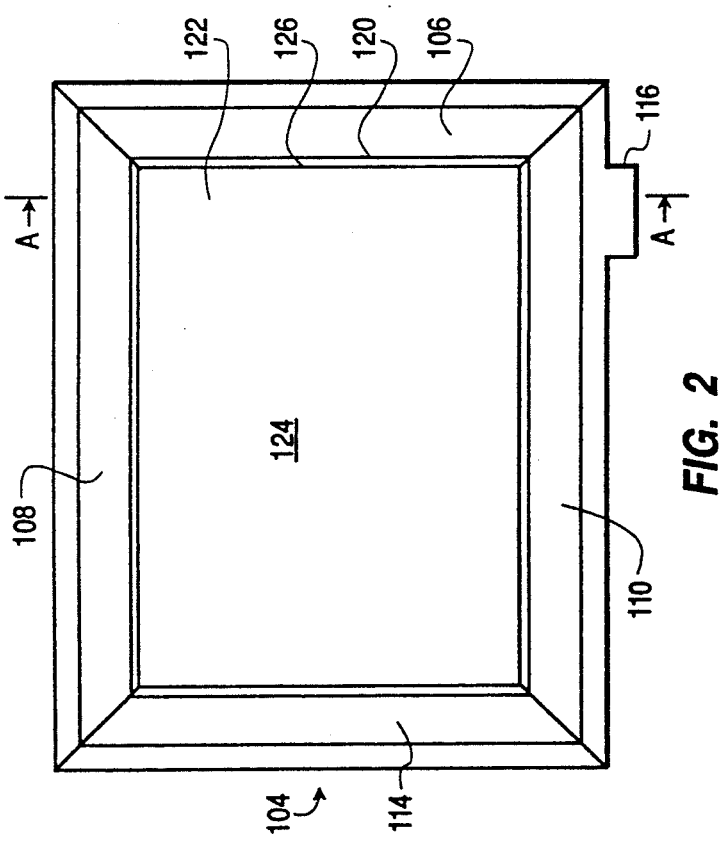
FIG. 2 is a front elevational view of an externally adaptable touch screen device in accordance with the invention.

FIG. 2 is a front view of the touch screen 104 of the invention which includes a bezel 106 having top and bottom rim portions 108 and 110, respectively, and side rim portions 112, 114. Rim portions 108, 110, 112 and 114 are shaped to fit over the existing bezel (not shown) of a video monitor. Bottom rim portion 110 is shown having a recess 116 to accommodate a pin connection (not shown) for a cable 105 (FIG. 1) to connect a printed circuit board 118 (FIG. 3) mounted in the back side of bezel 106 to an input port of a computer. Bezel 106 has an inner edge 120 surrounding an interior opening 122 which is covered with a planar transparent screen 124 sealed around its periphery with respect to inner edge 120 against the ingress of dust, humidity and liquid to protect the screen of a monitor with which touch screen 104 is used. Desirably, screen 124 is made of a polycarbonate VUEGUARD 901AG-CLR having anti-glare, anti-scratch and anti-reflective coatings. FIG. 2 also shows the edge of an optical filter VUEGUARD 901AG-RED63 126 having an infrared passband fastened to inner edge 120 around the inner periphery of bezel 106.

Figure 3:
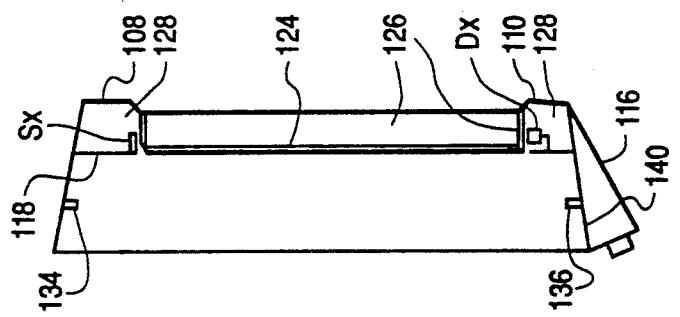
FIG. 3 is a cross sectional view of FIG. 1 along section line A—A as shown.
Figure 4A:
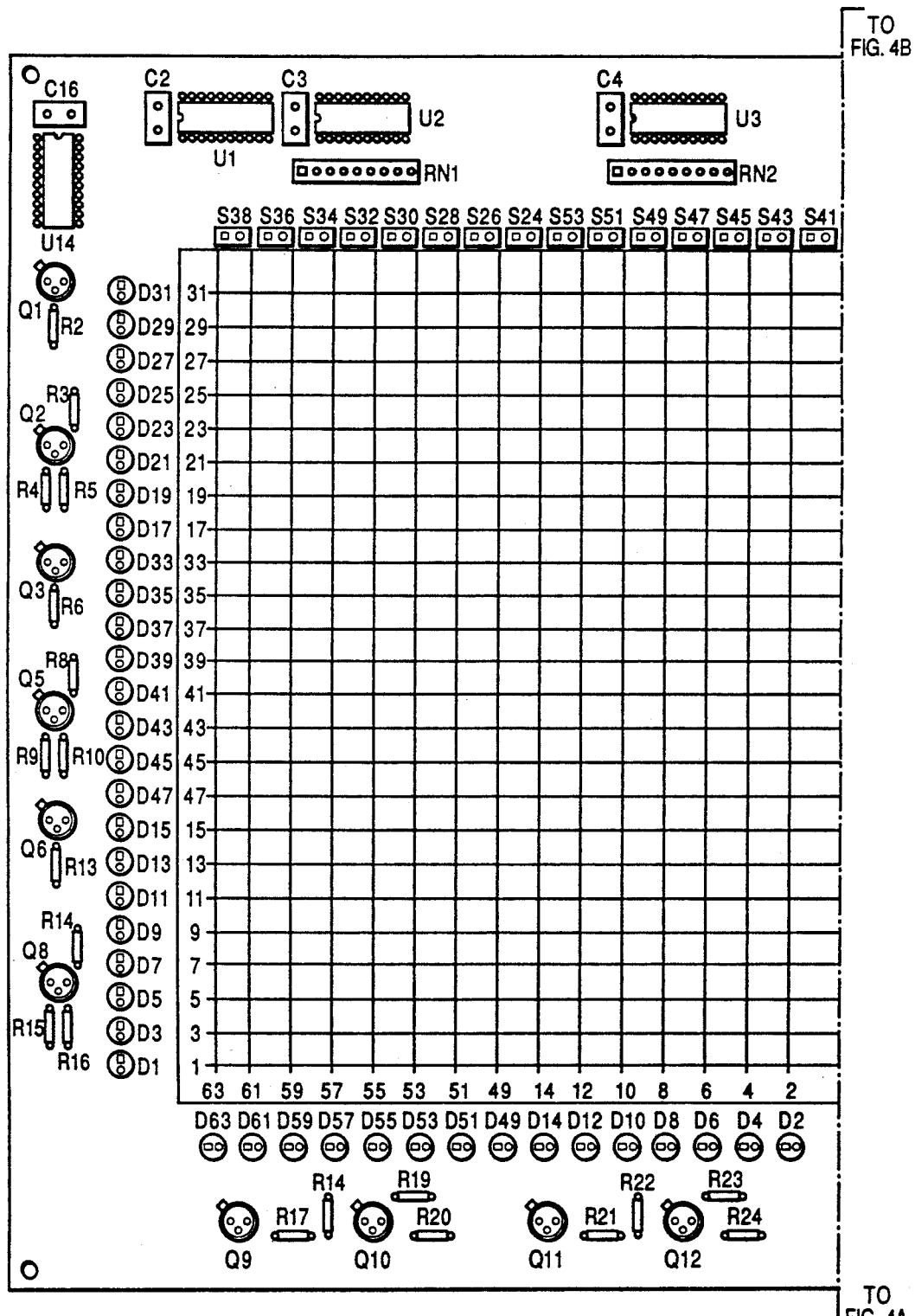
FIGS. 4A–4C together form a schematic showing a plan view of the printed circuit board of FIG. 3 illustrating the arrangement of IR emitters, IR sensors and other associated electronic circuitry, as well as the grid of IR beams formed thereby.
Figure 4B:
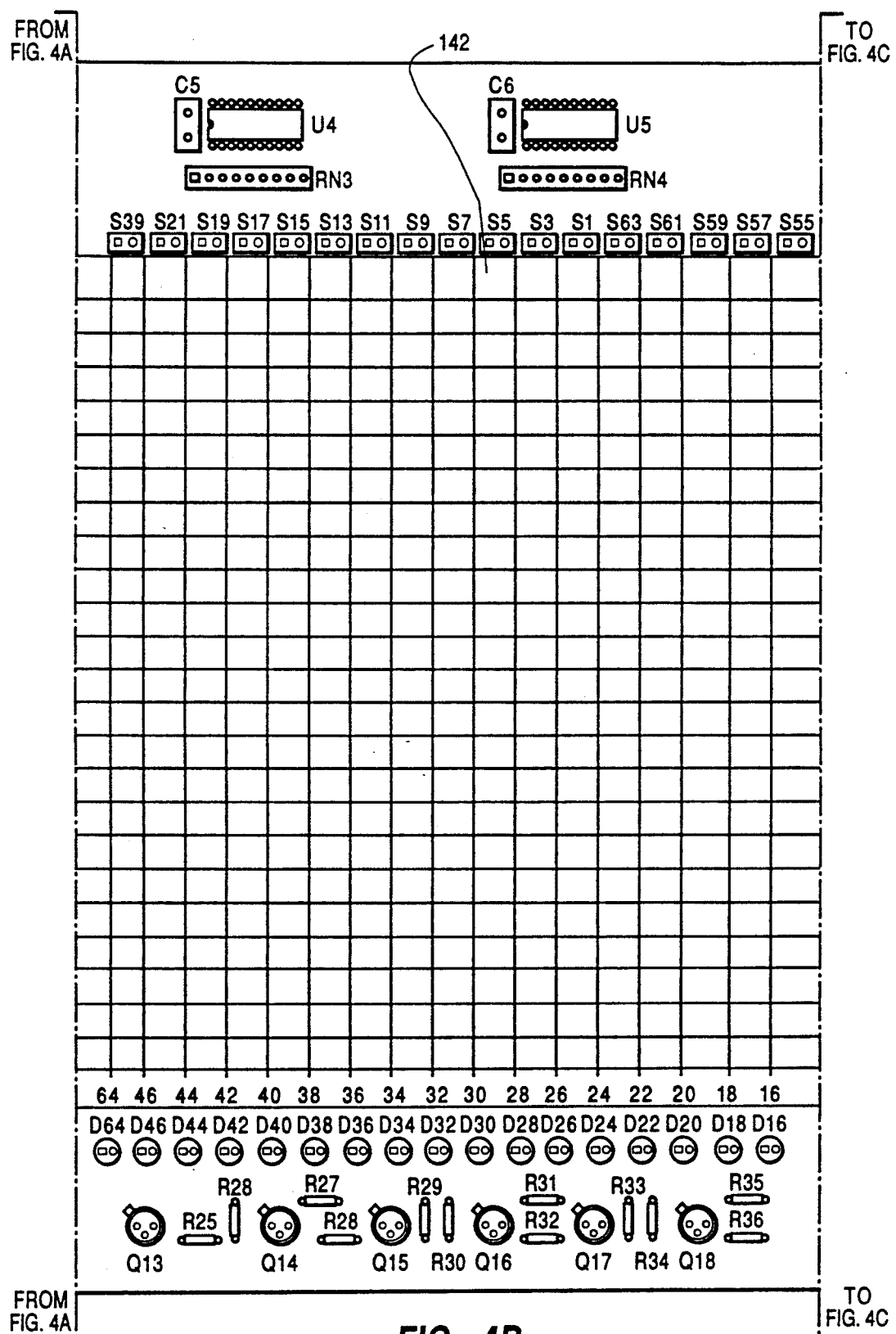
Figure 4C:
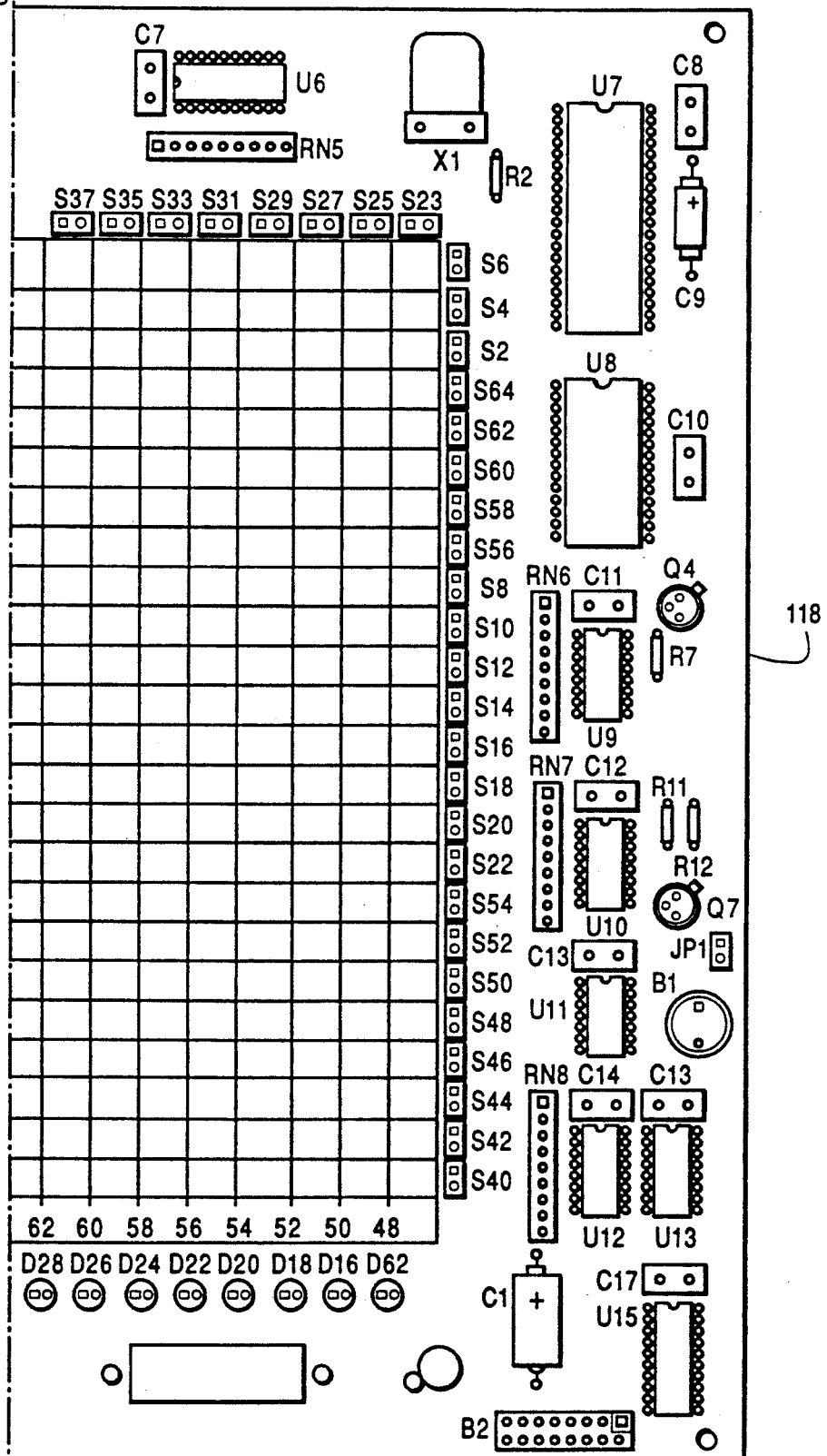

As shown in the cross sectional view of FIG. 3, circuit board 118 is suitably mounted in an interior recess 128 formed within rim portions 108, 110, 112 and 114. Only the top and bottom portions of circuit board 118 are visible in the cross section of FIG. 3. Circuit board 118 mounts a plurality of IR emitters D1 to D64 (see FIGS. 4A-4C) adjacent filter 126 at the bottom and one side of bezel 106 and a plurality of IR sensors S1 to S64 (see FIGS. 4A-4C) at the top and other side of bezel 106. Each IR emitter is paired with an oppositely disposed, optically aligned IR sensor, only one such pair DX, SX being visible in the cross section of FIG. 3. Circuit board 118 additionally mounts circuit components as shown in FIGS. 4A-4C for sequentially activating and scanning the IR emitters and sensors as will be described below. IR emitters D1 to D64 are sequentially activated according to a predetermined sequence described hereinafter to form an X-Y grid 142 of IR beams immediately in front of planar transparent screen 124.

As further shown in FIG. 3, bezel 106 is provided with detents 134 and 136 on the interior of the top and bottom walls 138 and 140, respectively, which cooperate with suitable openings provided in the bezel of the monitor to which bezel 104 is attached for securing bezel 104 to the monitor. Other suitable mechanisms for securing bezel 104 to a monitor will be apparent to those skilled in the art.

Figure 5B:
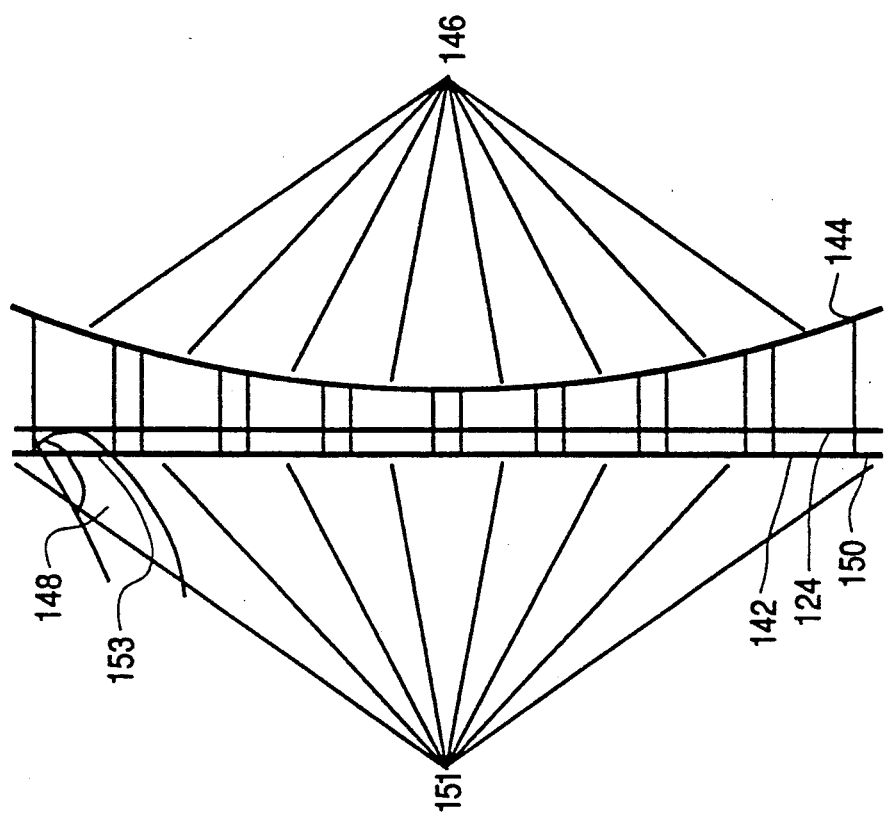
FIGS. 5A and 5B are diagrams illustrating parallax error and how it is overcome by the principles of the present invention.
Figure 5A:
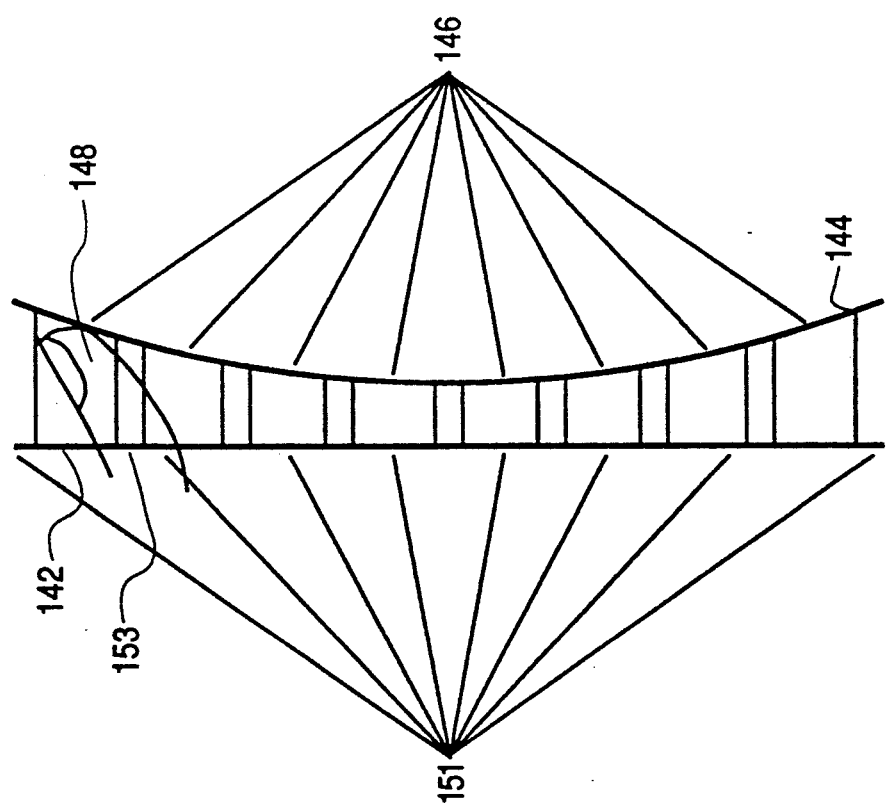

FIGS. 5A and 5B illustrate the problem of parallax error and its correction according to one aspect of the invention. FIG. 5A depicts a prior art arrangement in which parallax error is present. As can be seen from this figure, a curved screen 144 of a video monitor (not shown) displays a number of soft keys 146 which when touched, for example by a finger 148, are intended to send a command to a computer operatively connected to the monitor. This is accomplished by interrupting or blocking intersecting IR beams in the IR beam grid 142 in an active IR area 151 in front of a selected soft key 146 as will be understood by those skilled in the art. However, because screen 144 of the monitor is curved and grid 142 is separated a finite distance in front of screen 144, and further due to the fact that the user's line of sight is not always head-on to the desired touch point, the finger 148 or other pointer of the user may cross the IR grid 142 in a location not directly in front of the desired touch point, thus unintentionally blocking IR beams outside of the desired soft key are in an inactive area 153 and/or an adjacent active area 151 in front of a adjacent soft key. This could have the effect of sending an undesired command from an adjacent soft key to the computer or possibly no command if the blocked IR beams are in an inactive area (i.e. the coordinates of the blocked beams are not associated with any command recognized by the operating software in the computer). As may be appreciated, parallax error occurs more frequently towards the edge of the screen of the monitor where the curvature is greatest relative to the line of sight of the user.

FIG. 5B shows how parallax error is minimized by the principles of the present invention. As can be seen from this figure, by placing planar transparent screen 124 in front of monitor screen 144, and creating IR beam grid 142 directly in front of planar screen 124, the user's finger 148 or other pointer only passes a short distance through the IR grid before being stopped by planar screen 124, thus minimizing the possibility of unintentionally blocking IR beams outside of the active IR area in front of the desired soft key.

Figure 6:
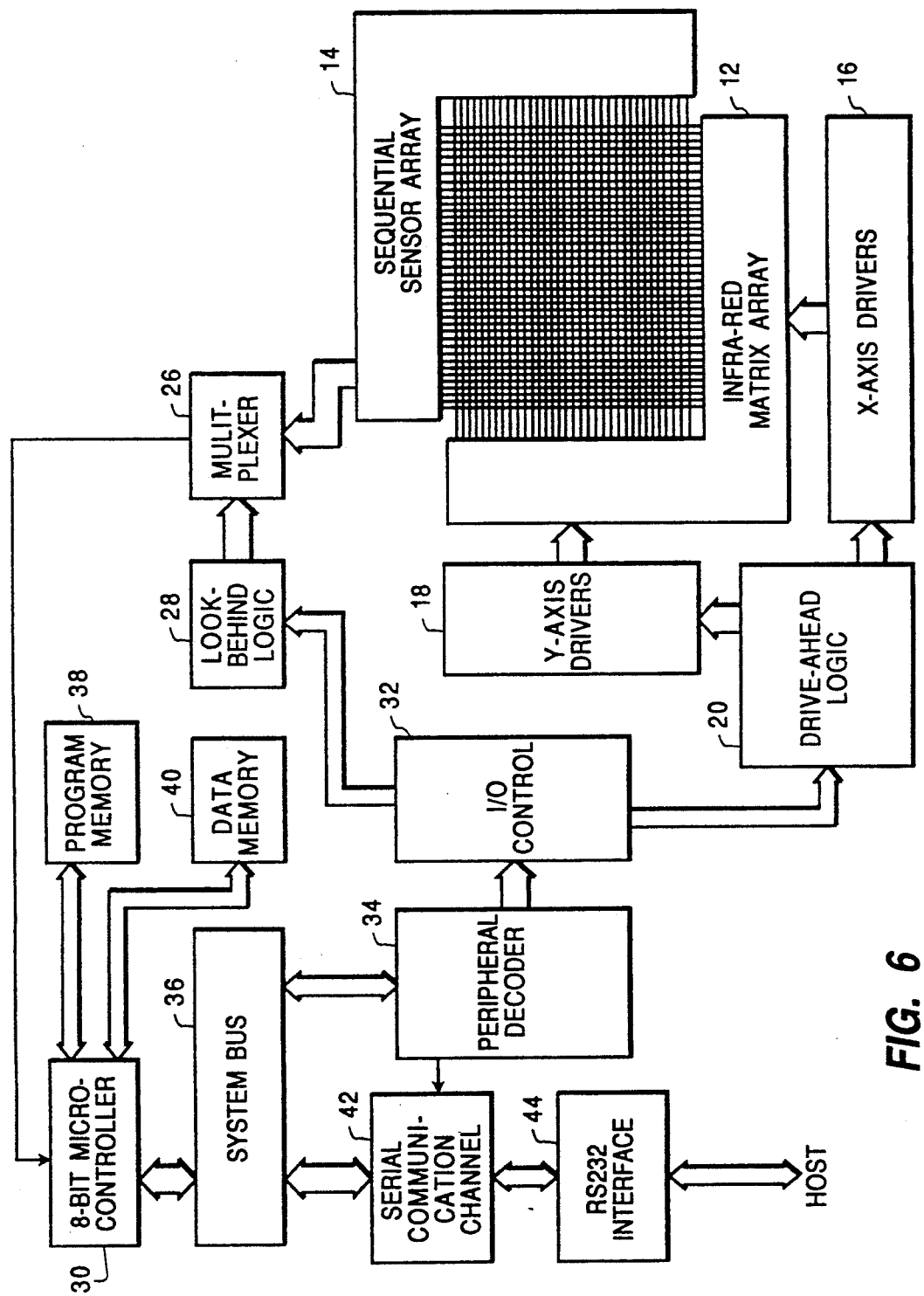
FIG. 6 is a block circuit diagram of an embodiment showing the electronics of a touch screen device in accordance with the principles of the invention.
Figures 1, 7A:
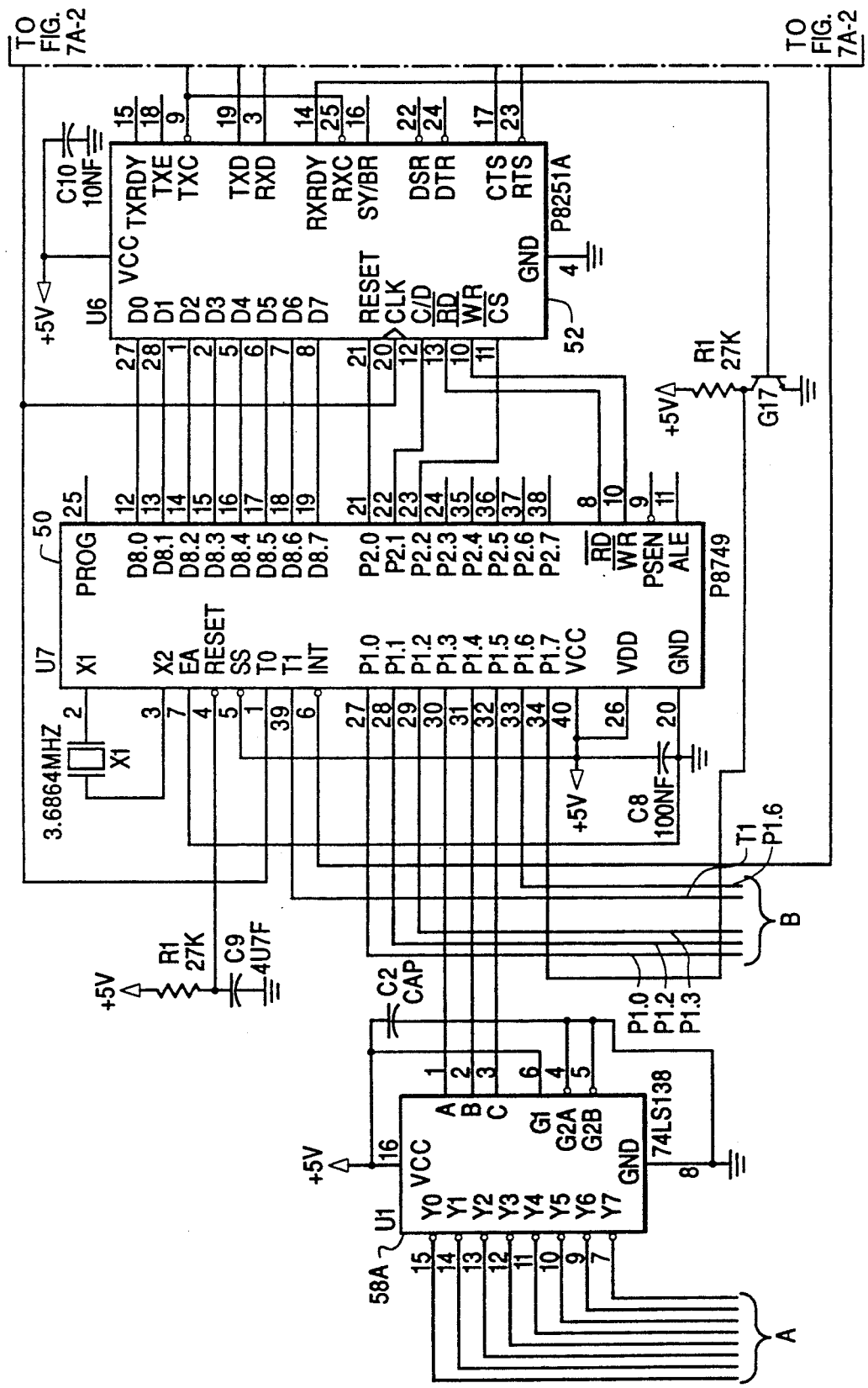
Figures 2, 7A:
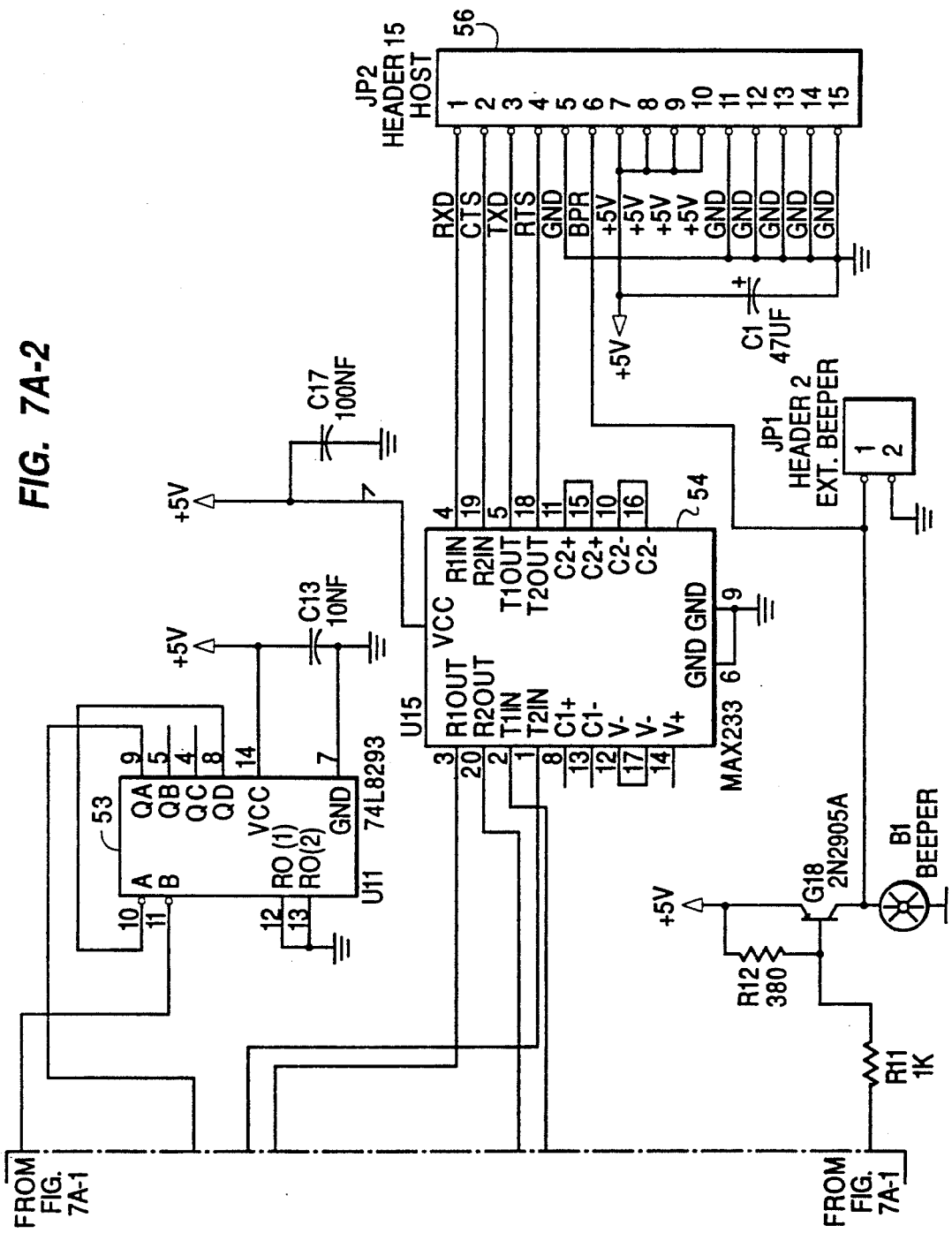

Referring to FIG. 6, there is shown a block circuit diagram of the electronics integrated into the externally adaptable bezel according to one embodiment of the invention. As shown in this figure, an infrared matrix array 12 of infrared emitters D1 to D64 is disposed along the bottom and left-hand side of the bezel and a sequential sensor array 14 of infrared sensors S1 to S64 is disposed at the top and right-hand side of the bezel as previously shown and discussed. The infrared emitter array 12 is activated by x-axis and y-axis drivers 16 and 18, respectively, which are in turn controlled by drive-ahead logic 20 to be described. Sequential sensor array 14 is connected to a multiplexer 26 which is controlled by look-behind logic 28 to be described. Look-behind logic 28 and drive-ahead logic 20 communicate with an 8-bit microcontroller 30 by way of I/O control 32, peripheral decoder 34, and system bus 36. Multiplexer 26 additionally has a feedback to microcontroller 30. Microcontroller 30 includes a program memory 38 and data memory 40, which for purposes of illustration are separately shown. The output of the touch screen device is communicated by microcontroller 30 as an input to a host computer (not shown in FIG. 6) by way of a serial communication channel 42 and a suitable interface 44. FIGS. 7A-1 to 7A-2, 7B-1 to 7B-2 and 7C-1 to 7C-4 show a circuit schematic implementing the block circuit diagram of FIG. 6. Referring first to FIGS. 7A-1 to 7A-2, an 8-bit microcontroller 50, such as an Intel P8048H, forms the heart of the system for controlling the activation and scanning of the IR emitters and sensors. The low cost of the Intel P8048H microcontroller and its characteristics including a built-in program memory, data memory, two parallel ports (P1 and P2), a timer-counter, a system bus (address, data and bus control), a system clock generator, one interrupt input, two programmable bidirectional bits (T0 and T1), and one hardware reset input, make this device particularly suitable for running the system according to the invention. The program memory of the Intel P8048H is a non-volatile memory cell array, having a total size of one thousand twenty four bytes, which is adequate for accommodating an average instruction length of two bytes. Data memory residing in the Intel P8048H has a total memory length of 64 bytes. Sixteen locations are used for working registers (R0 to R7 and R0' to R7'). Sixteen other locations are used for the eight level stack. Therefore, the total user data memory is limited to 32 bytes. Microcontroller 50 corresponds to 8-bit microcontroller 30, system bus 36, program memory 38 and data memory 40 of FIG. 6. Other commercially available 8-bit microcontrollers may be employed for implementing the invention as will be apparent to those skilled in the art.

A resistor R1 and a capacitor C9 are connected to the reset input of microcontroller 50 to form a time delay to insure the proper hardware start-up for the microcontroller after power-up. Bidirectional pin T0 of microcontroller 50 is programmed as an output to be used as a clock generator for a serial communications device 52, which may be implemented, for example, by an Intel P8251A. Software in microcontroller 50 programs one third (1.2288 MHz) of the internal clock (3.6864 MHz) to pin T0. The resulting digital clock output is connected to the clock input of serial communications device 52 and to a binary counter 53 used as a frequency divider to generate the 76.8 KHz needed for the communications baud rate that is finally connected to the transmitter clock input (TXC) and receiver clock input (RXC) of communications device 52. During initialization the microcontroller program will set the transmitting and receiving clock rates to 1/16 of this frequency, resulting in a baud rate of 4800 (equivalent to a communications speed of 480 bytes per second). Devices 52 and 53 correspond to serial communications channel 42 in FIG. 6.

Microcontroller 50 controls, reads and writes to communications device 52 via the system bus and the lower three bits (P2.0 to P2.2) of parallel port P2. Communications device 52 sends, receives and controls the handshake through its pins TXD, RXD, RTS and CTS. When a character arrives at communications device 52 it raises the output control pin RXRDY that is connected to a silicon NPN transistor (type 2N3904) G17 used to invert the polarity of this signal and finally generate an interrupt to microcontroller 50 via the INT pin. A level converter device 54, such as a Maxim 233, is used to provide the corresponding RS-232 standard communication levels. The output of this converter is finally wired to a 9 pin, DB-type, female connector 56 whose pin arrangement matches the standard IBM-PC configuration. Converter device 54 and connector 56 correspond to interface 44 shown in FIG. 6. The P1.7 output of microcontroller 50 is connected to a low power transistor (2N2905A) G18 used to drive a built-in beeper B1 used as an audio transducer.

Figures 1, 7B:
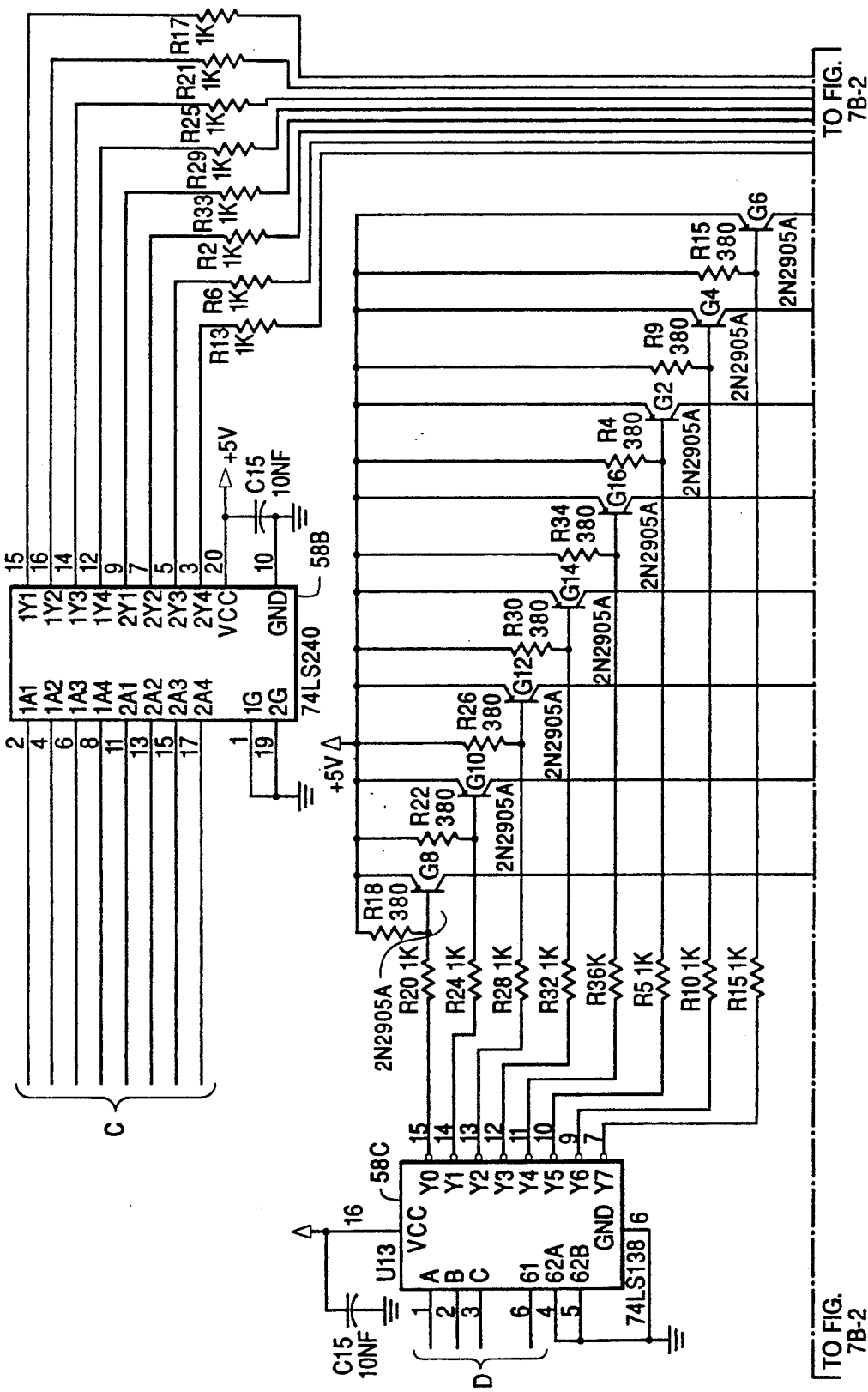
Figures 2, 7B:
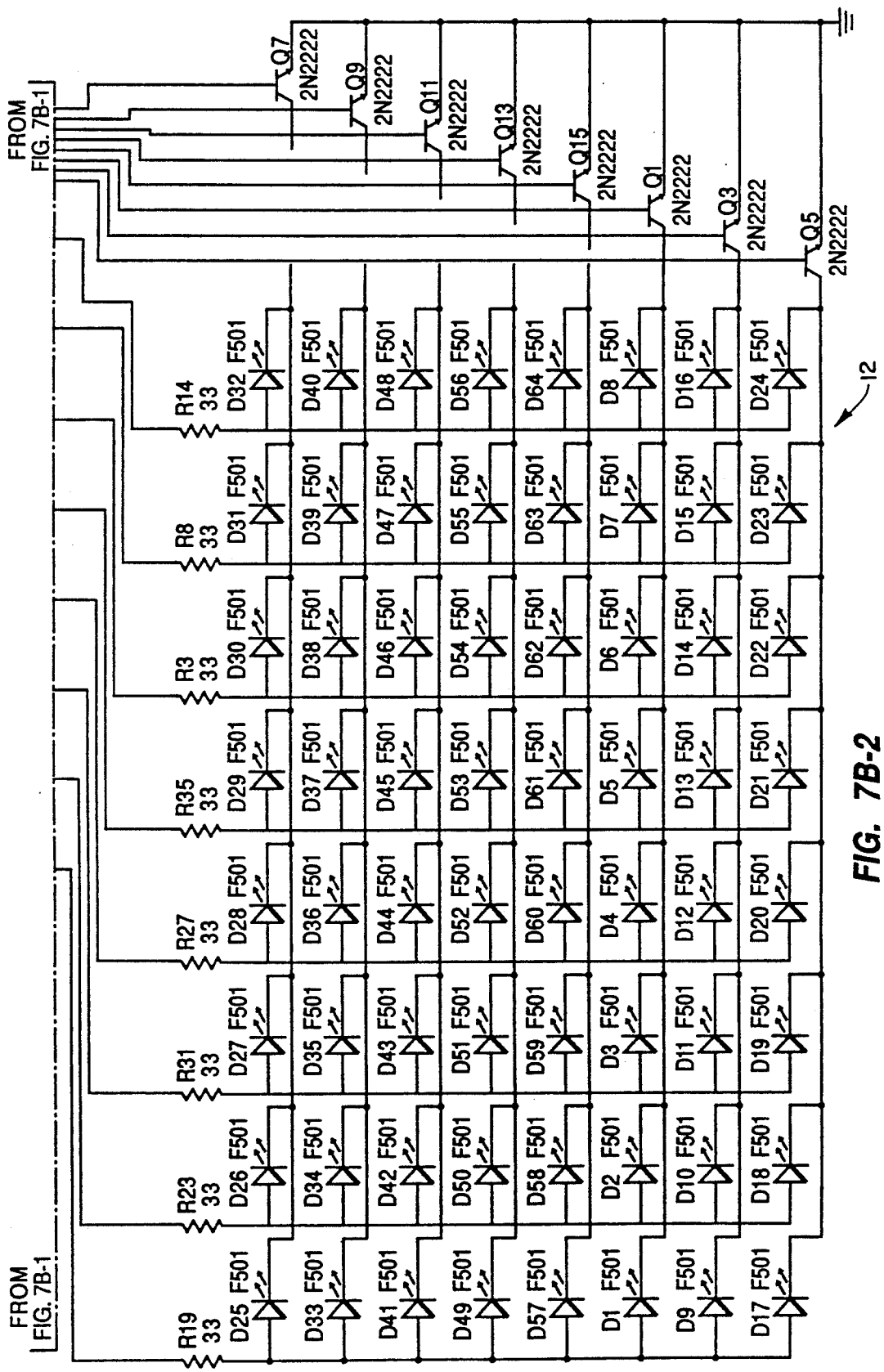

The infrared matrix array 12 of FIG. 6 is schematically shown in FIGS. 7B-1 to 7B-2 as comprising the sixty-four infrared emitters D1 to D64 arranged electrically in an 8×8 matrix. The emitters are preferably gallium-aluminum-arsenide semiconductor light emitting diodes, such as a General Electric F5D1, which has a peak emission of 6 milliwatts at a wavelength of 880 nanometers. To sequentially energize emitters D1 to D64, an X-Y matrix of sixteen semiconductor drivers is employed. The eight NPN (2N2222) transistors (G1, G3, G5, G7, G9, G11, G13 and G15) are connected on the Y-axis so that each NPN transistor is connected to a respective one of the eight cathodes of the emitters in the respective rows as shown and the eight PNP (2N2905) transistors (G2, G4, G6, G8, G10, G12, G14 and G16) are connected on the X-axis so that each PNP transistor is connected to a respective one of the eight anodes of the emitters in the respective columns as shown. Emitters D1 to D64 are activated in numerical sequence by selectively turning on the appropriate row and column transistors.

Although for purposes of illustration and ease of explanation of the electrical connection of emitters D1 to D64 they are shown arranged in a matrix, the actual placement of emitters, D1 to D64 around the bezel is as illustrated in FIGS. 4A-4C. Thus, although the emitters are activated in numerical sequence, the sequence in which the IR beams are formed in grid 142 shown in FIGS. 4A-4C depends on the actual placement of the emitters around the bezel which is an important feature of the invention as will become apparent from subsequent description.

Figures 1, 7C:
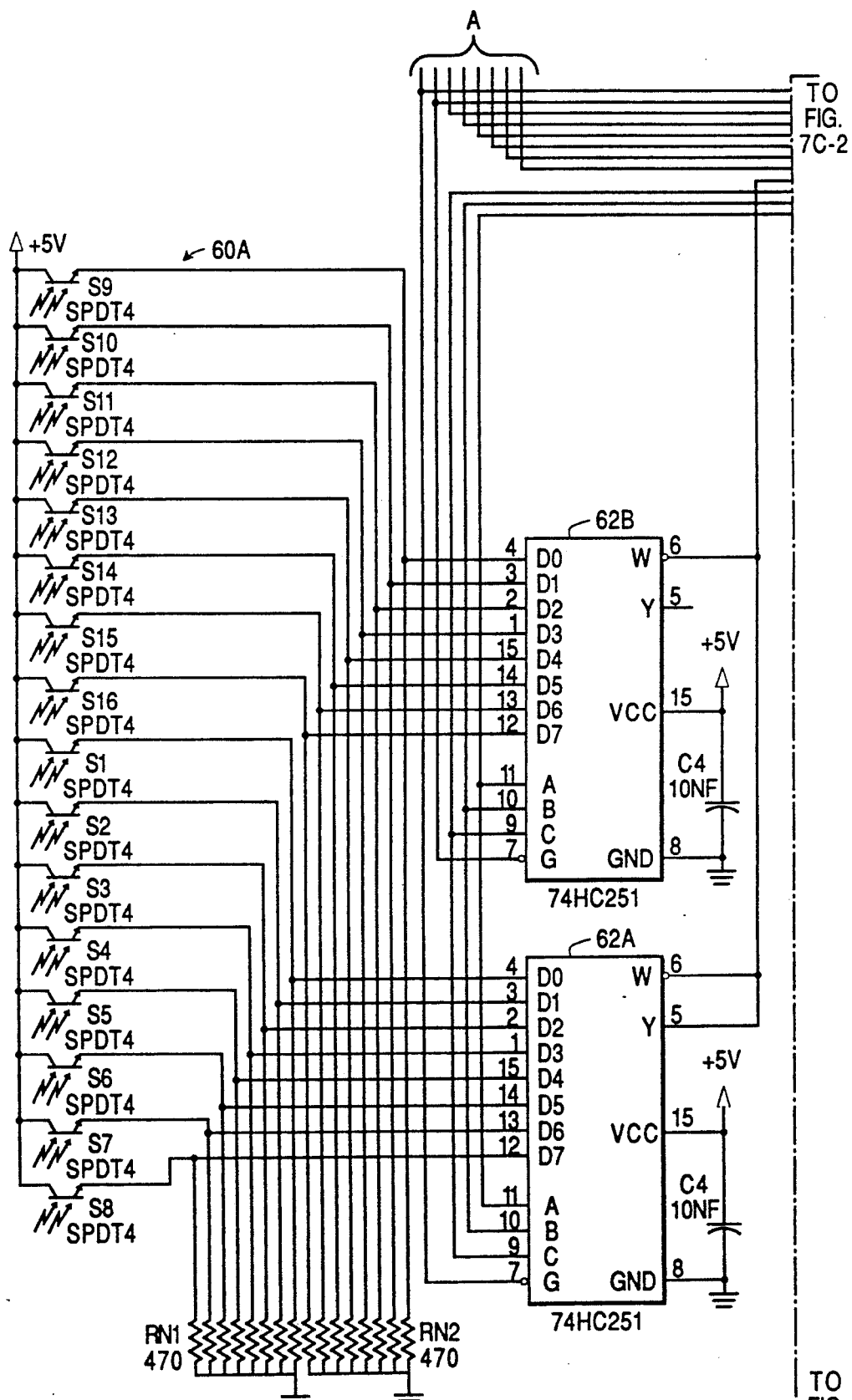
Figures 2, 7C:
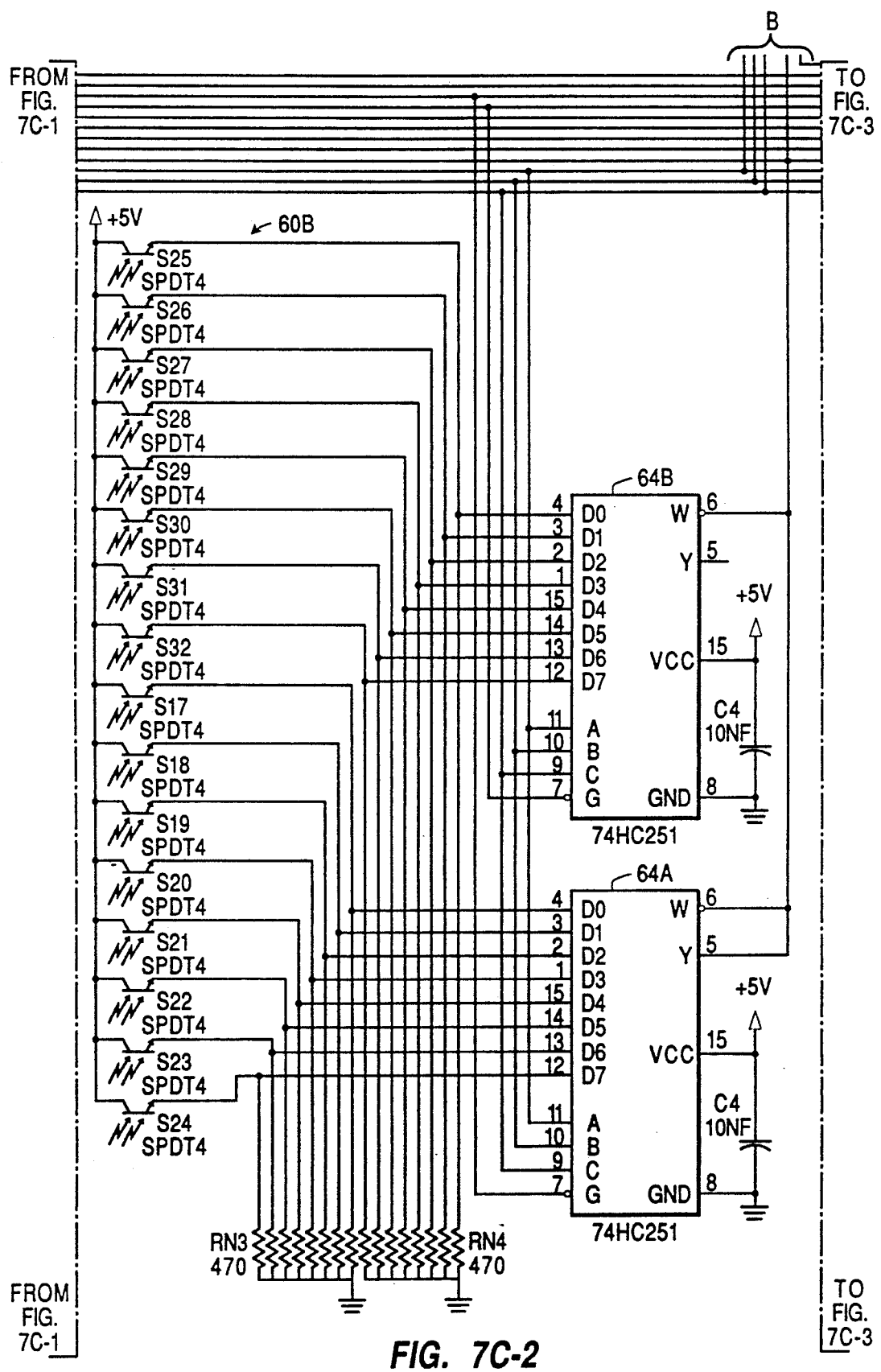
Figures 3, 7C:
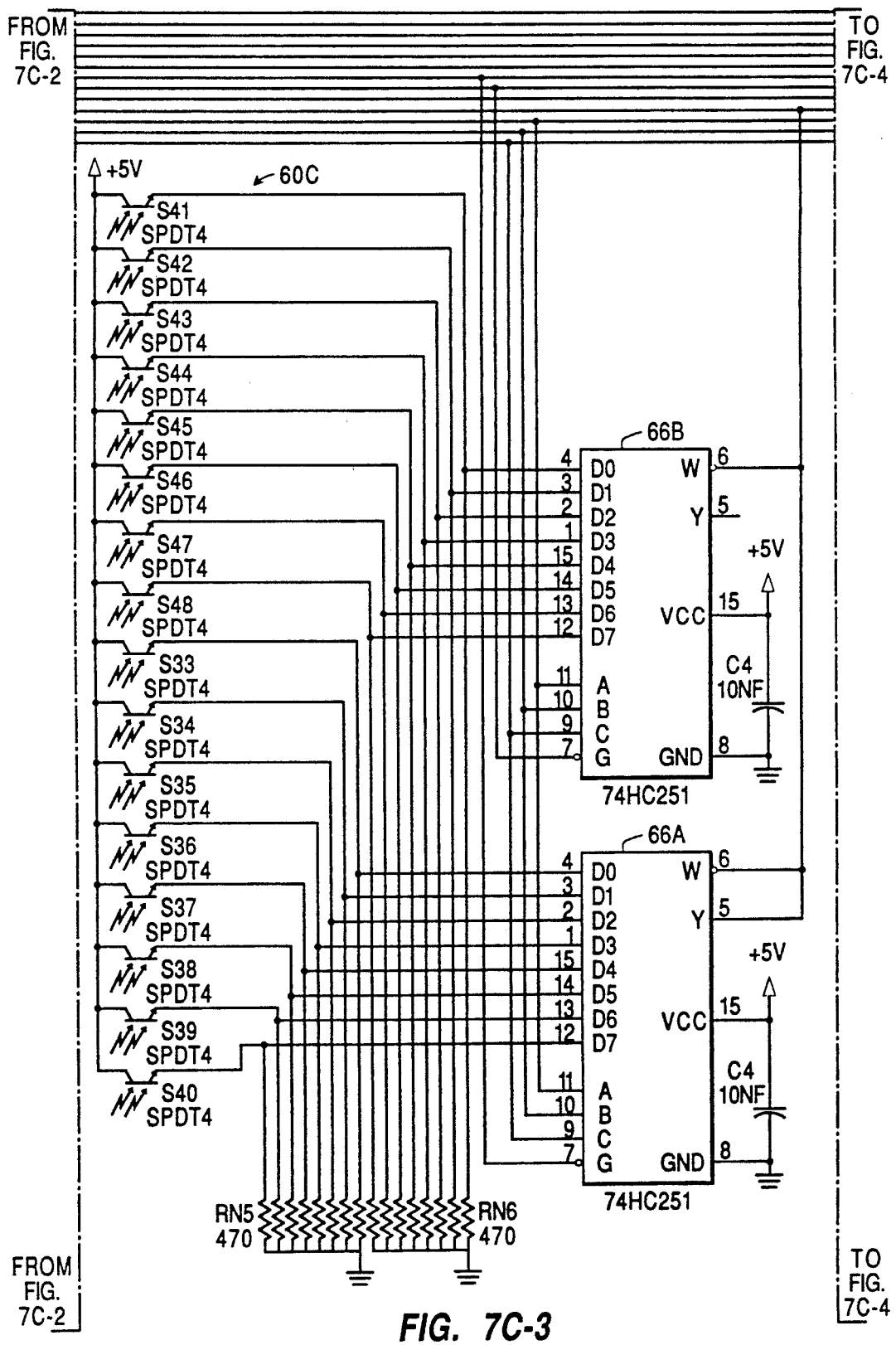
Figures 4, 7C:
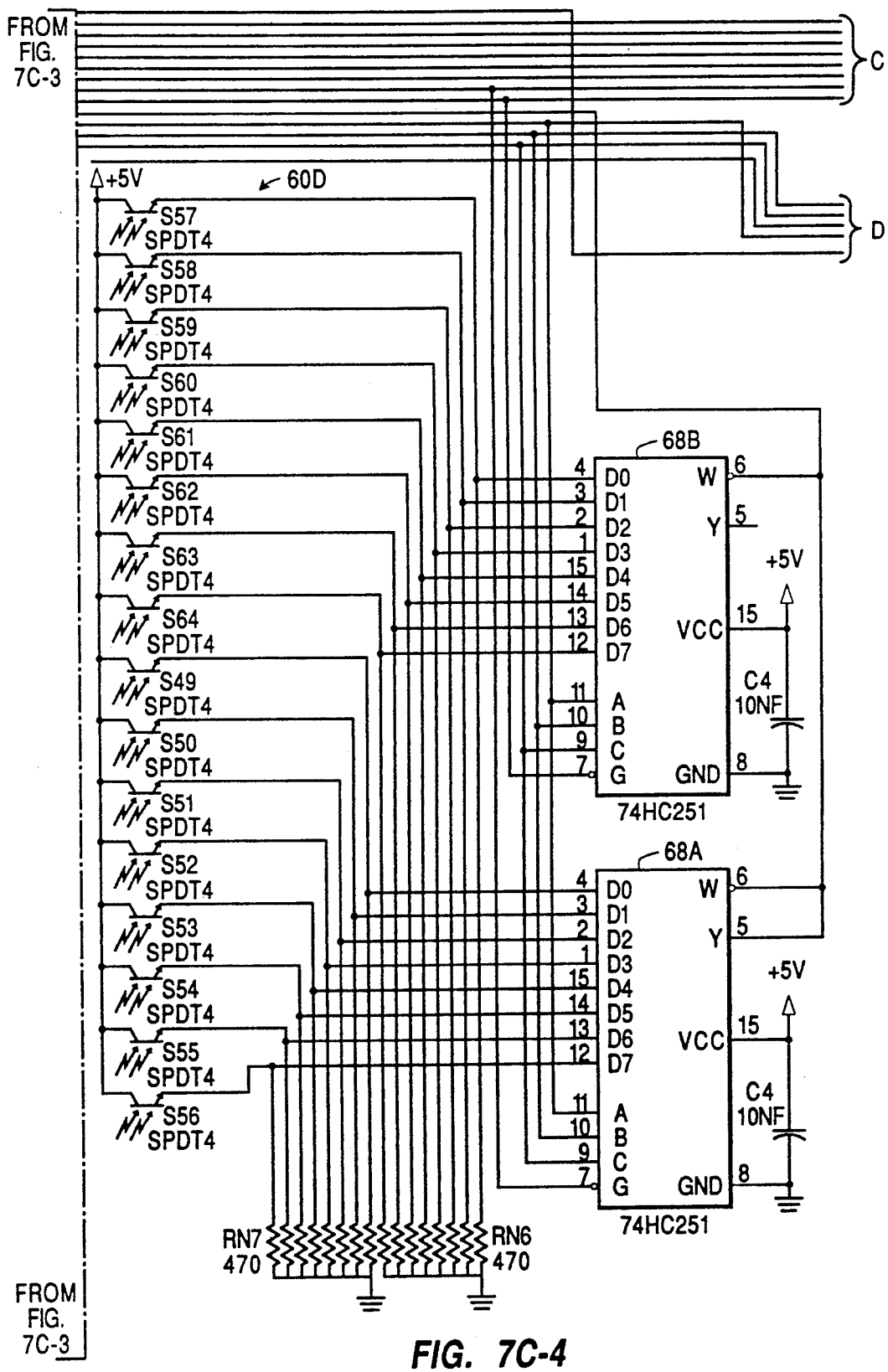

The semiconductor drivers G1 to G16 are energized by way of decoding logic implemented by semiconductor chips 58A, 58B and 58C, which preferably comprise integrated circuit types 74LS138, 74LS240 and 74LS138, respectively, as controlled by microprocessor 50. The lower seven bits, P1.0 to P1.6, of parallel port P1 of microprocessor 50 are used to generate the control signals for the decoding logic. Referring additionally to FIGS. 7C-1 to 7C-4, it can be seen that pins P1.0 to P1.2 and P1.6 are connected to chip 58C to control the X-axis semiconductor drivers G2, G4, G6, G8, G10, G12, G14 and G16 and pins P1.3 to P1.5 are routed to chip 58A whose outputs Y0 to Y7 are routed to chip 58C for controlling the Y-axis semiconductor drivers G1, G3, G5, G7, G9, G11, G13 and G15. The sequence by which emitters D1 to D64 are activated is referred to as drive-ahead logic because the energized emitter is always one beam ahead of the sensor that is being scanned as will be further, explained below.

Referring to FIGS. 7C-1 to 7C-4, there is shown 64 IR sensors S1 to S64 arranged in four columns 60A, 60B, 60C and 60D, respectively. In a preferred embodiment sensors S1 to S64 each comprise a phototransistor connected in an emitter follower configuration. The phototransistor is preferably type SPDT manufactured by Silicon Sensors, Inc. which is a full-visible band silicon phototransistor with enhanced response in the infrared region (790 to 1200 nanometers), thus matching the infrared emission of the emitters.

Eight multiplexers are provided for scanning the sensors. A first pair of the multiplexers 62A, 62B is connected to sensors in column 60A, with sensors S1 to S8 being connected to multiplexer 62A and sensors S9 to S16 being connected to multiplexer 62B. A second pair of multiplexers 64A, 64B is connected to sensors in column 60B, with sensor S17 to S24 being connected to multiplexer 64A and sensors S25 to S32 being connected to multiplexer 64B. A third pair of multiplexers 66A, 66B is connected to sensors in column 60C, with sensors S33 to S40 being connected to multiplexer 66A and sensors S41 to S48 being connected to multiplexer 66B. A fourth pair of multiplexers 68A, 68B is connected to the sensors in the fourth column 60C, with sensors S49 to S56 being connected to multiplexer 68A and sensors S57 to S64 being connected to multiplexer 68B. In a preferred embodiment the multiplexers are each comprised of an integrated circuit type 74HC251.

The multiplexers are connected to the output lines of chip 58A as shown for selectively scanning the sensors in a mutually exclusive manner in a sequence corresponding to the sequence for activating the emitters with the exception that the sensor scanning sequence is always one beam behind the activated emitter. The output pin W of each multiplexer is connected to the bidirectional pin T0 of microcontroller 50 for reading the output of the respectively scanned sensors.

Look-behind logic 28, I/O control 32, peripheral decoder 34 and drive-ahead logic 20 of FIG. 6 are implemented by microchips circuits 58A, 58B and 58C as shown in FIGS. 7A-1 to 7C-4. Sequential sensor array 14 of FIG. 6 is implemented by the columns of transistors 60A, 60B, 60C and 60D, and the pairs of multiplexers 62A-62B, 64A-64B, 66A-66B, and 68A-68B constitute exclusive sensor multiplexer 26.

Figure 8:
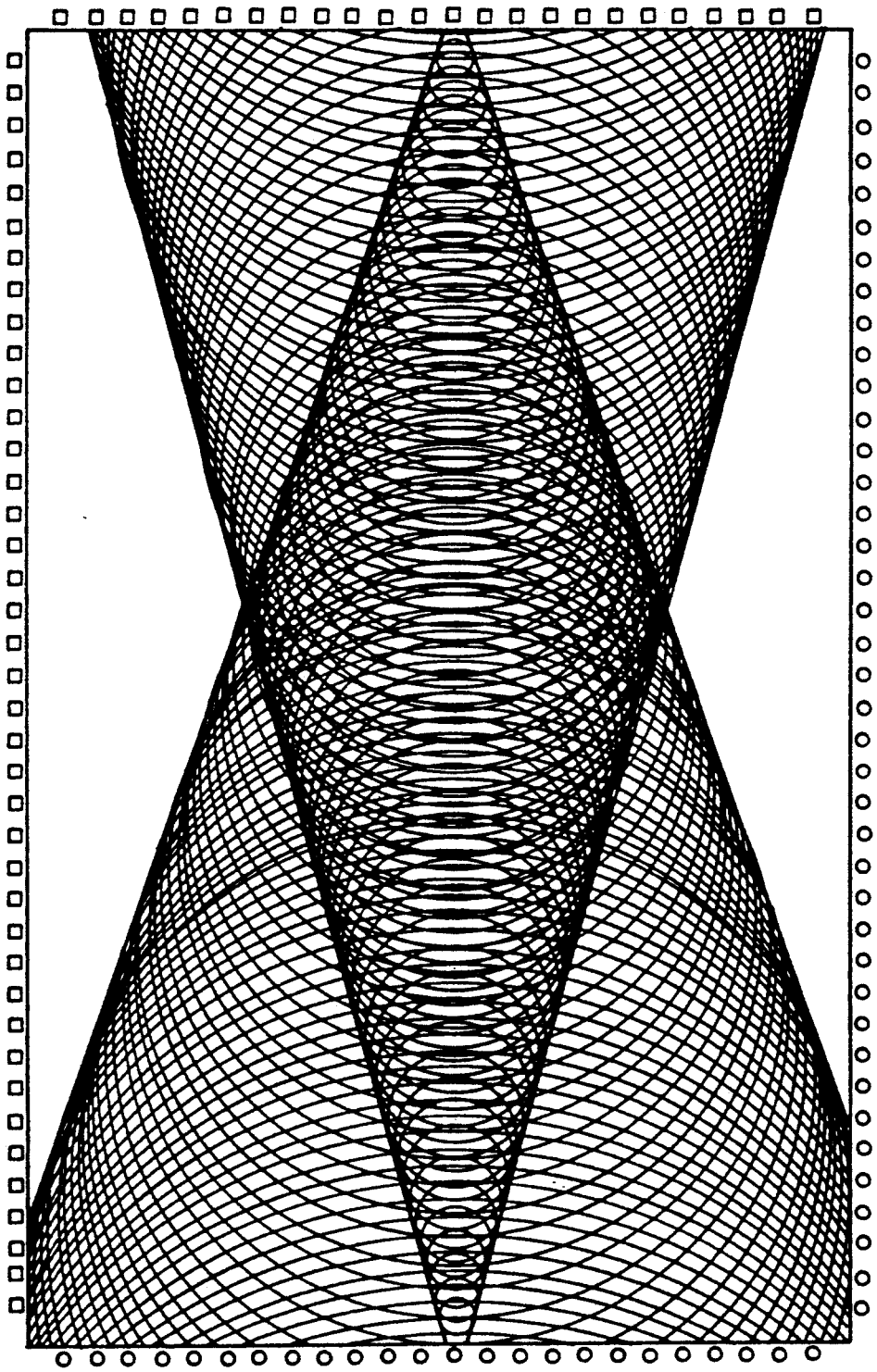
FIG. 8 is a schematic showing the projection angle of an IR emitter and viewing angle of an IR sensor which is used in explaining the activation and scanning sequences according to the invention.

FIG. 8 is a diagram showing the projection angle of an activated IR emitter on the left-hand side of the figure and the viewing angle of an optically aligned IR sensor being scanned on the right-hand side of the figure. As can be seen, due to the dispersion of the IR beam a number of oppositely disposed sensors o either side of the optically aligned sensor are bathed with IR light. Concomitantly, the viewing angle of each sensor has the shape of a cone with an aperture angle of about 60°. The situation illustrated in FIG. 8 can present a problem in that there is a turn-on period during which the intensity of IR light from an activated emitter builds up to a maximum intensity and a turn-off period after discontinuance of activating current during which the intensity of IR light from the emitter dies down. As a result, if the IR beam of an emitter is blocked, its optically aligned sensor may still sense IR light from another oppositely disposed emitter which is just turning on or just turning off and whose projection angle causes IR light to fall on that sensor. To avoid this problem, it is a feature of the present invention to scan the sensors one beam behind the activated emitters and to position the sensors relative to the emitters so that a currently scanned sensor is outside of the projection angle of a currently activated emitter. The scanned sensor is thus reading the light from the previously activated emitter whose IR light intensity is decreasing from its activated maximum intensity. This activating and scanning sequence has the added benefit of increasing the scanning rate since it is not necessary to build in a delay in the scanning sequence to separately accommodate the turn-on period of each emitter.

Figure 9:
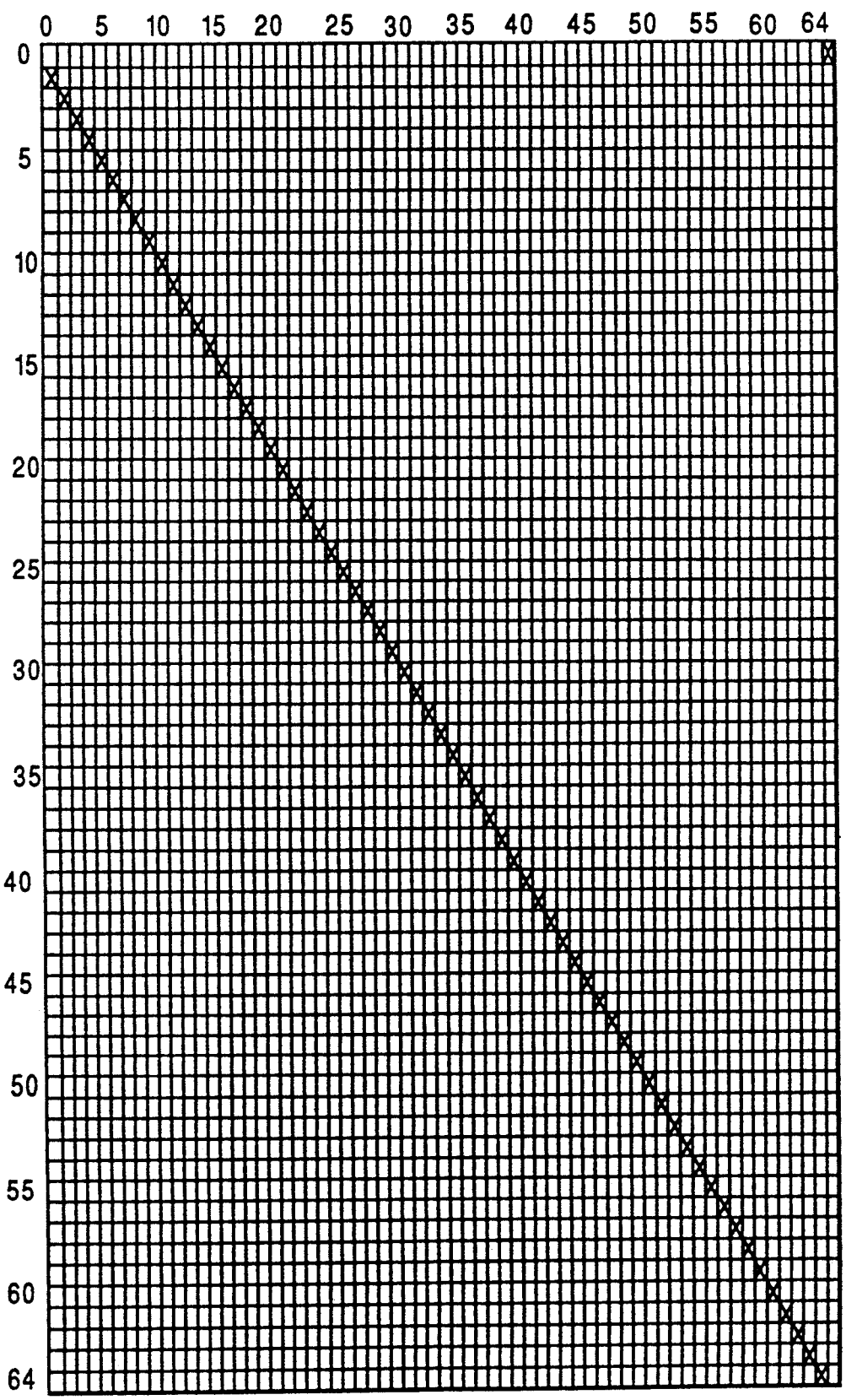
FIG. 9 is a timing diagram showing an IR emitter activation sequence and IR sensor scanning sequence employed according to a preferred embodiment of the invention.

FIG. 9 shows a timing diagram for activating the emitters and scanning the sensors according to an embodiment of the invention, wherein the emitters and sensors are position around the bezel as illustrated in FIGS. 4A-4C. In FIG. 9, the numbers across the top of the diagram indicate the activated emitters and the numbers down the left-hand side of the diagram indicate the previously activated emitter that is being scanned by a sensor. It should also be borne in mind that the numerical counter programmed into microcontroller is reset to 64 and decremented each activation and scan cycle. Thus, when emitter D64 is activated by its corresponding drivers G6 and G15 (see FIGS. 7B-1 to 7B-2), the sensor opposite the previously activated emitter D1 (that sensor being S40) is scanned. When the next emitter D63 is activated by its corresponding drivers G4 and G15, the sensor opposite the previously activated emitter D64 (that sensor being S39) is scanned. When the next emitter D62 is activated by its corresponding drivers, the sensor opposite the previously activated emitter D63 (that sensor being S38) is scanned, and so on. A look-up table stored in the software of microcontroller 5 identifies electronic addresses for each decrement of the counter from 64 down to 1 which when decoded by the look-ahead logic identifies the appropriate emitters to be activated and when decoded by the look-behind logic identifies the appropriate sensors to be scanned in accordance with the predetermined sequence illustrated by the timing diagram in FIG. 9 and the location of the emitters shown in FIGS. 4A-4C. The activation and scanning sequences ensures that a currently scanned sensor is completely outside of the projection angle of a currently activated emitter and thus can receive IR light only from its optically aligned, previously activated emitter whose IR beam is at that point in time decreasing from its activated maximum intensity.

The FIG. 10 series of drawings are flow charts for the computer software operating microcontroller 50 for achieving the activating and scanning sequences discussed above. At power-up, the microcontroller starts executing code at location 0, where the program forces a branch to the INIT routine (see FIGS. 10A-2 and 10B-2), which sets all hardware and data start-up conditions, calls a self-test subprogram, checks the result of the self-test, will report the result of the self-test to the host computer, and branch to execute the MAINL program after enabling the microcontroller for recognition of external interrupts (caused by communications with the host computer).

Figures 1, 10A:
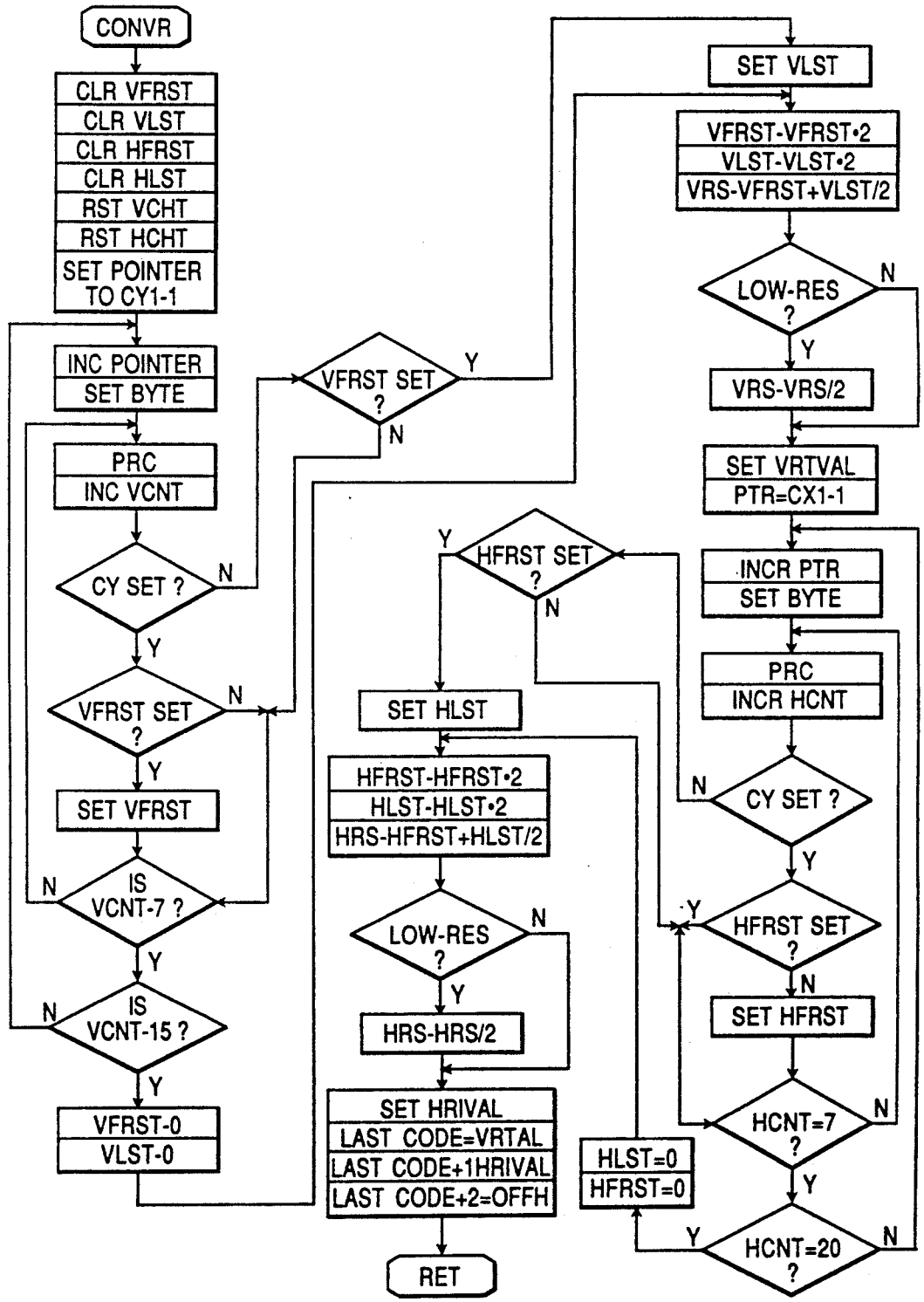
Figures 3, 10A:
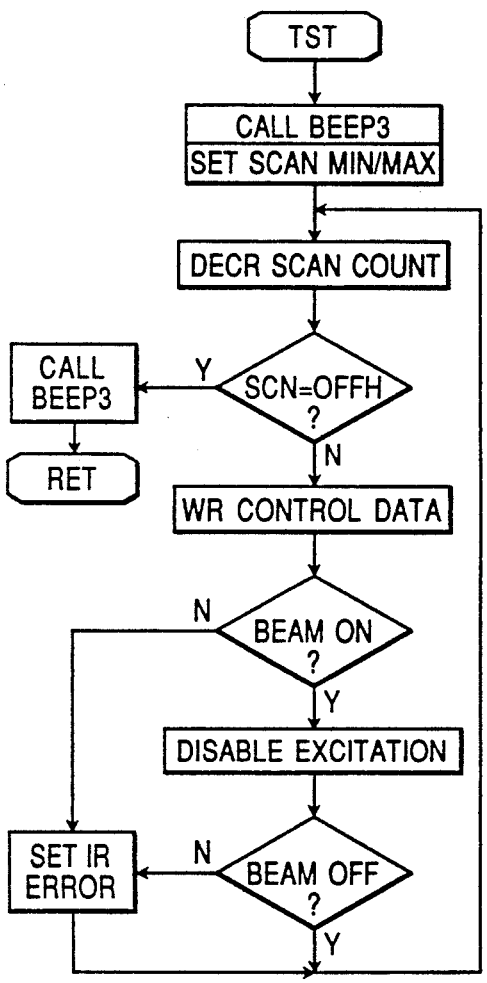
Figures 4, 10A:
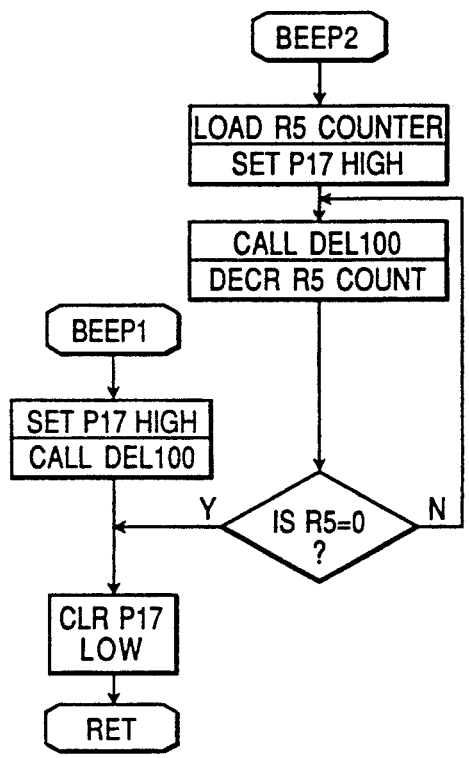
Figures 6, 10A:
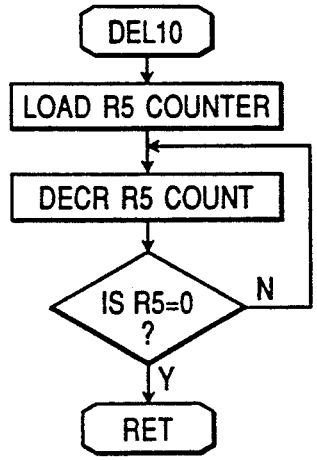
Figures 7, 10A:
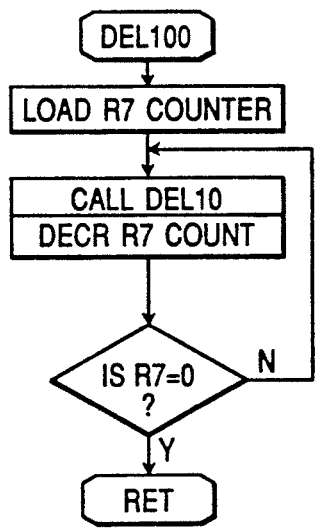
Figures 1A, 10B:
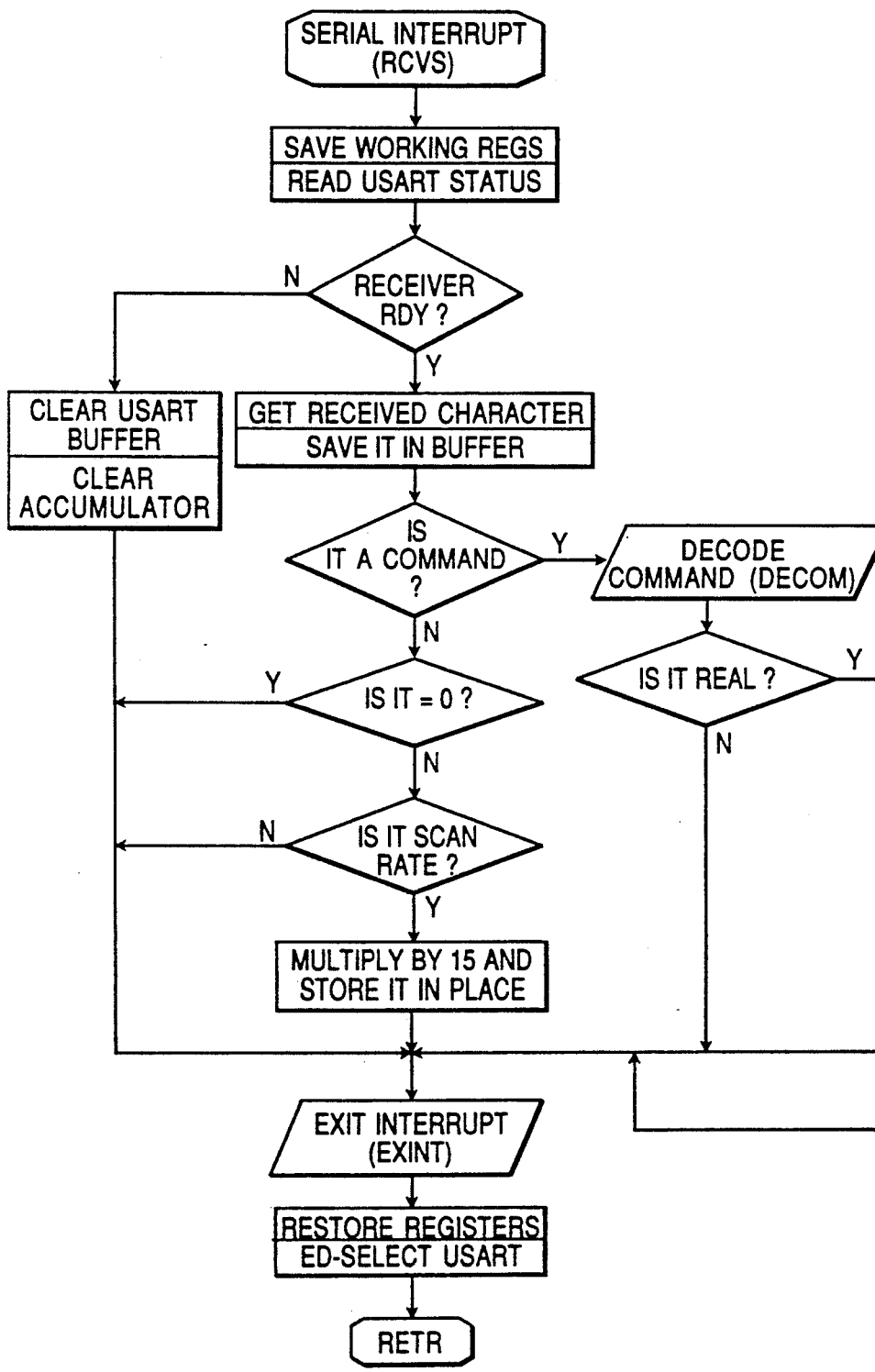
Figures 3, 10C:
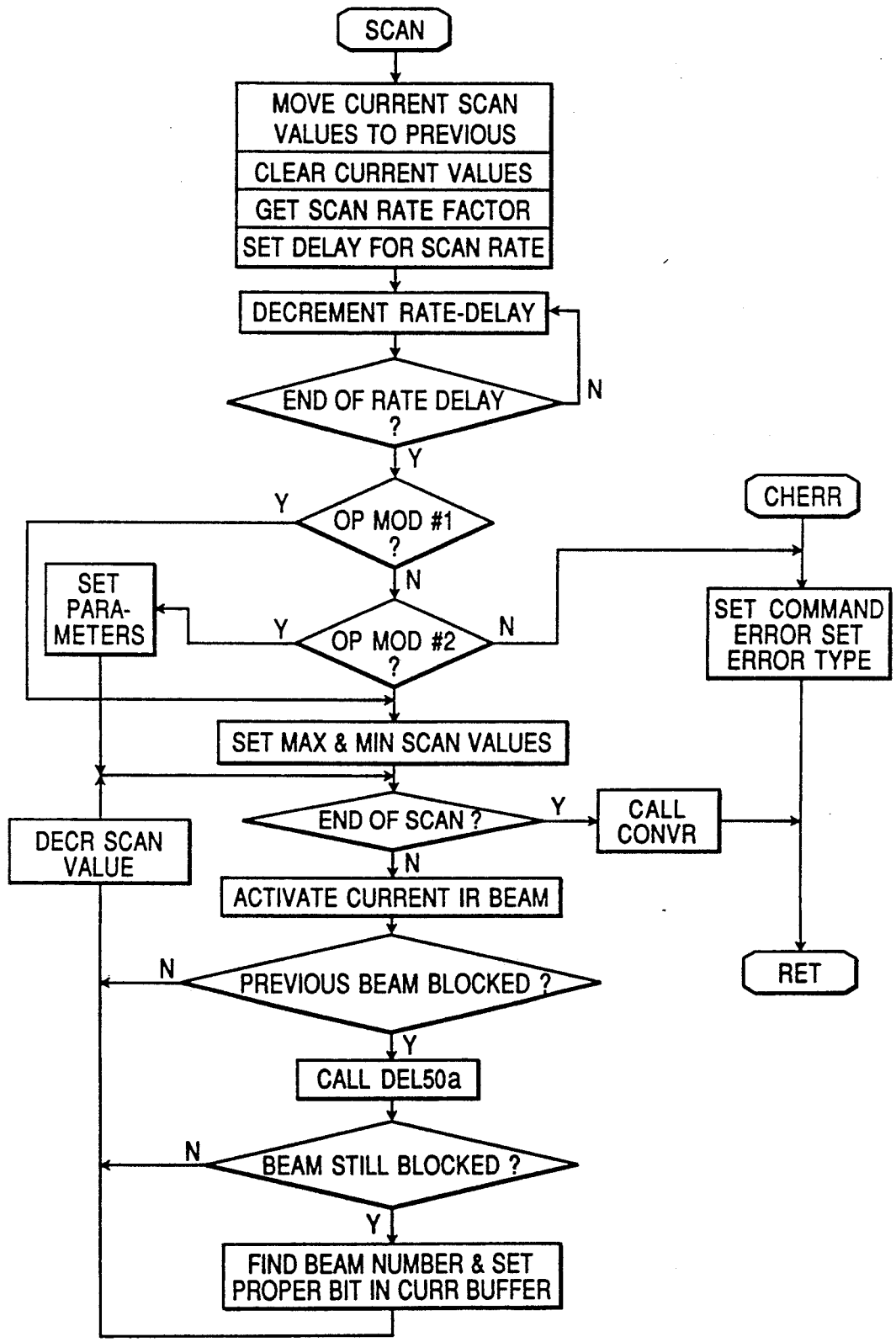
Figures 2, 10C:
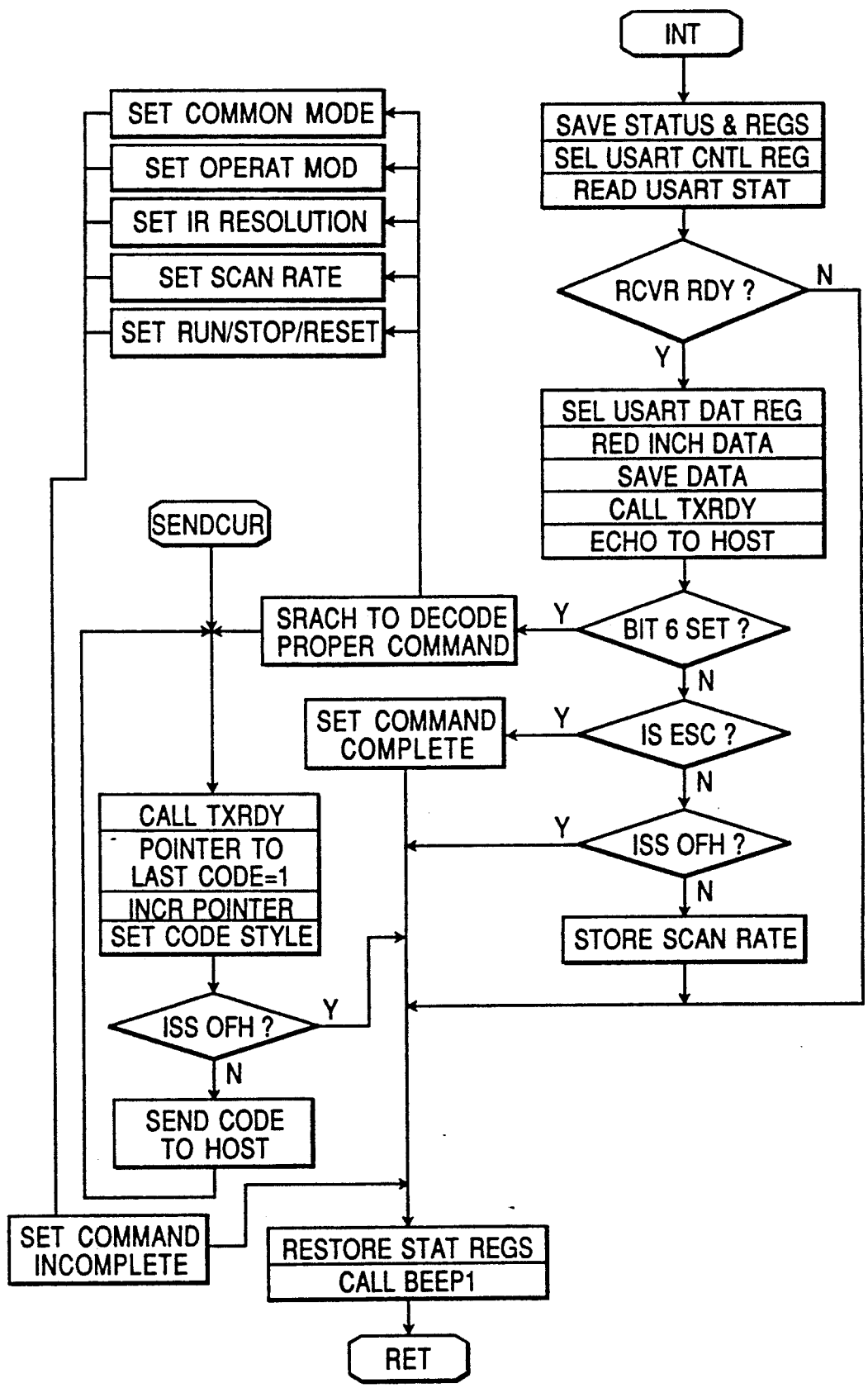

MAINL, shown in FIG. 10C-1, as the name suggests, is the main loop (the core of all program operations). During its execution, it will continuously monitor system variables and current command status. Based on its findings it will force the execution of other subprograms or tasks.

SCAN, shown in FIG. 10C-3, is the subprogram that deals with the actual scanning of the infrared arrays, the one that finds the user's finger, generates the corresponding set of coordinates, converts those into the proper character set, and sends the result to the host computer. Examining the flow-chart, it will be easy to find that as soon as the "activate current IR beam" takes place, the program is reading the "previous beam" (no settling time delay between activation and sensing). If a beam is found to be blocked, then, a time delay is inserted, on purpose, to verify for the user's positive action and avoid unwanted spurious signals.

CONVR, shown in FIG. 10A-1, is the "blocked beams" to "real coordinates" conversion subprogram. It has embedded a number of intelligent subroutines to verify the integrity of the scan results, to generate the high-resolution virtual beams by finding the center of a large area beam-blockage and averaging the coordinates of the blocked beams, and return the result to the MAINL. The averaging technique in effect creates virtual beams between the real beams, doubling the resolution of the touch screen.

TST, shown in FIG. 10A-3, is the subprogram that executes the self-test at power-up (without human intervention) and the host computer requested continuous test.

INT, shown in FIG. 10C-2, is the subprogram that analyzes and processes the commands received from the host computer.

DEL10, shown in FIG. 10A-6, is a small time delay subroutine, used by the SCAN subprogram only when a beam is not found and also used by other time delay subroutines as a base delay.

DEL100, shown in FIG. 10A-7, is a long time delay subroutine, used only by the beeper control subroutines, shown in FIGS. 10A-4 and 10A-5, (user audio feedback) BEEP1, BEEP2, and BEEP3.

SENDCUR (see FIGS. 10B-1A to 10B-1B, 10C-1 and 10C-2) is a subroutine used in different subprograms to transmit the result of the current scan process to the host computer SENDER, shown in FIG. 10C-5, is a GENERAL PURPOSE subroutine used in different subprograms to transmit any found error in communications, during the scan process, and/or while executing a test.

CHERR (see FIGS. 10C-1 and 10C-3) is a GENERAL PURPOSE subroutine that flags a "command-error" type.

TXRDY (see FIG. 10C-5) is a GENERAL PURPOSE subroutine used by any of the serial transmitting tasks, to assure that the communications controller is free to transmit a new data character when needed.

In a preferred embodiment, the system will use a VGA video monitor display that is capable of 43 lines by 80 columns in text mode, or 640 by 480 graphic pixels. A quick overlook at the number of tasks that may be necessary to implement, using the touch-screen, shows that the user may need to be able to select single words that may appear at any position on the screen. From the graphics point of view, it is very important, that the IR-grid resolution must be an integer factor of the number of pixels in the CRT (8×10 pixels per grid).

For these reasons, the touch-screen developed has a total resolution of 79×47 real and virtual beams that cover all possible needs, the virtual beams being created by averaging the coordinates of multiple blocked beams.

According to this embodiment, the system will provide 3840 touch points on the video screen (matrix of 79 by 47), enabling the addressing of every character on the screen in VGA mode or even use of graphic capabilities in high resolution video mode.

Obviously, numerous and additional modifications and variations of the present invention are possible in light of the above teachings. It is therefore to be understood that within the scope of the appended claims, the invention may be practiced otherwise than as specifically claimed.

What is claimed is:

1. An infrared touch screen device that is externally adaptable to a video monitor for serving as an input device to an electronic device connected to the monitor, comprising:

a bezel adapted to be releasably secured over a viewing end of a video monitor, said bezel defining an interior space through which a screen of a monitor to which said bezel is attached can be viewed; eams in said interior space when said emitters are activated, wherein said emitters are semiconductor devices which emit infrared light when an activating current is passed therethrough;

a plurality of infrared sensors disposed along said bezel, each said sensor being optically aligned with an oppositely disposed one of said emitters;

activating means mounted on said bezel for activating said emitters in a predetermined sequence, said activating means includes means for passing an activating current through respective ones of said emitters in said predetermined sequence;

scanning means mounted on said bezel for scanning said sensors in a sequence corresponding to said predetermined sequence and lagging said predetermined sequence by a predetermined time delay, said sensors each producing output signals corresponding to the presence and absence, respectively, of infrared light emitted by an oppositely disposed infrared emitter; and communication means for coupling the output signals of said sensors to an input port of an electronic device connected to the monitor.

2. A device as defined in claim 1, further comprising a planar transparent screen disposed in said interior space and fastened to said bezel.

3. A device as defined in claim 2, wherein said emitters and said sensors are disposed on said bezel so that the grid of infrared beams is formed on the side of said planar transparent screen remote from the screen of a monitor to which said bezel is attached.

4. A device as defined in claim 2, wherein said planar transparent screen is sealed relative to said bezel to seal against dust, humidity and liquid.

5. A device as defined in claim 2, wherein said planar transparent screen is comprised of a polycarbonate material.

6. A device as defined in claim 5, wherein said planar transparent screen is scratch resistant.

7. A device as defined in claim 5, wherein said planar transparent screen has anti-reflective characteristics.

8. A device as defined in claim 5, wherein said planar transparent screen has anti-static characteristics.

9. A device as defined in claim 1, wherein said bezel has an inner edge surrounding said interior space and further comprising an optical filter having an infrared passband fastened to said inner edge, said emitters and said sensors each being disposed on a side of said optical filter remote from said interior space so that infrared beams emitted by respective ones of said emitters pass through said optical filter a first time prior to entering said interior space and pass through said optical filter a second time upon exiting said interior space before being received by respective ones of said sensors.

10. A device as defined in claim 1, wherein said predetermined time delay is such that when a given emitter is activated by an activating current, a sensor oppositely disposed to the emitter activated immediately preceding the given emitter is concurrently scanned.

11. A device as defined in claim 10, wherein said emitters each emit infrared light over a predetermined projection angle, and said scanning means scans said sensors so that a currently scanned sensor is outside of the projection angle of a concurrently activated emitter.

12. A device as defined in claim 1, wherein said scanning means includes processing means for converting output signals corresponding to the absence of beams to coordinates identifying the location of an object which is blocking beams in said grid.

13. A device as defined in claim 12, wherein said processing means includes averaging means for determining a coordinate at a midpoint between two adjacent blocked beams in said grid.

14. A device as defined in claim 1, further comprising storage means for storing a look-up table containing electronic addresses of said emitters and said sensors; counting means connected to said storage means for sequentially accessing said electronic addresses; first decoder means connected to said storage means for decoding the accessed electronic addresses for activating said emitters in the predetermined sequence; and second decoder means for decoding the accessed electronic addresses for scanning the sensors in the sequence corresponding to said predetermined sequence.

15. A device as defined in claim 14, wherein said activating means comprises an X-Y matrix of semiconductor drivers connected to said first decoder means, with each emitter being selectively activated according to said predetermined sequence by a unique pair of X and Y drivers.

16. A device as defined in claim 14, wherein said scanning means includes multiplexing means connected to said second decoder means for selectively reading the sensors in a mutually exclusive manner according to the sequence corresponding to the predetermined sequence.

17. An infrared touch screen for a video monitor for serving as an input device to an electronic device connected to the monitor, the monitor having a viewing screen and a bezel surrounding the screen, comprising:
a plurality of infrared emitters disposed along said bezel to form a grid of vertical and horizontal infrared beams in front of the screen of the monitor when said emitters are activated by an activating current;
a plurality of infrared sensors disposed along said bezel, each said sensor being optically aligned with an oppositely disposed one of said emitters;
activating means for activating said emitters in a predetermined sequence, said activating means including means for passing no activating current through said emitters in said predetermined sequence;
scanning means for scanning said sensors in a sequence corresponding to said predetermined sequence, said sensors each producing output signals corresponding to the presence and absence, respectively of an infrared beam emitted by an oppositely disposed infrared emitter, the corresponding sequence by which said scanning means scans the oppositely disposed sensors lagging said predetermined sequence by a predetermined time delay; and
communication means for coupling the output signals of said sensors to an input of an electronic device connected to the monitor.

18. A device as defined in claim 17, wherein said predetermined time delay is such that when a given emitter is activated by an activating current, a sensor oppositely disposed to the emitter activated immediately preceding the given emitter is concurrently scanned.

19. A device as defined in claim 18, wherein said emitters each emit infrared light over a predetermined projection angle, said scanning means scans said sensors so that a currently scanned sensor is outside of the projection angle of a concurrently activated emitter.

20. A device as defined in claim 18, wherein said processing means includes averaging means for determining a coordinate at a midpoint between two adjacent blocked beams in said grid.

21. A device as defined in claim 17, wherein said scanning means includes processing means for converting output signals corresponding to the absence of beams to coordinates identifying the location of an object which is blocking beams in said grid.

22. A device as defined in claim 17, further comprising storage means for storing a look-up table containing electronic addresses of said emitters and said sensors; counting means connected to said storage means for sequentially accessing said electronic addresses; first decoder means connected to said storage means for decoding the accessed electronic addresses for activating said emitters in the predetermined sequence; and second decoder means for decoding the accessed electronic addresses for scanning the sensors in the sequence corresponding to said predetermined sequence.

23. A device as defined in claim 22, wherein said activating means comprises an X-Y matrix of semiconductor drivers connected to said first decoder means, with each emitter being selectively activated according to said predetermined sequence by a unique pair of X and Y drivers.

24. A device as defined in claim 22, wherein said scanning means includes multiplexing means connected to said second decoder means for selectively reading the sensors according to the sequence corresponding to the predetermined sequence.

25. An infrared touch screen device that is externally adaptable to a video monitor for serving as an input device to an electronic device connected to the monitor, comprising:
a bezel adapted to be releasably secured over a viewing end of a video monitor, said bezel defining an opening through which a screen of a monitor to which said bezel is attached can be viewed;
a planar transparent screen secured to said bezel and covering said opening;
infrared beam generating means, including a plurality of infrared emitters mounted on said bezel, for generating a grid of infrared beams adjacent said planar transparent screen on a side of said planar transparent screen remote from a screen of a video monitor to which said bezel is to be attached, said infrared beam generating means including activating means for activating said emitters in a predetermined sequence;
sensing means, including a plurality of infrared sensors mounted on said bezel, for sensing the presence and absence of respective beams in said grid and producing output signals corresponding to the presence and absence, respectively, of the infrared beams, said sensing means including scanning means for scanning said sensors in a sequence corresponding to said predetermined sequence which lags behind said predetermined sequence so that a currently scanned sensor scans a previously activated emitter; and communication means for communicating the output signals of said sensing means to an electronic device connected to the monitor to which said bezel is attached.

26. The device as defined in claim 25, further comprising filter means having an infrared passband disposed in front of said sensing means for passing substantially only infrared light to said sensing means.

27. The device as defined in claim 26, wherein said emitters and said sensors are positioned on said bezel so that a currently scanned sensor receives substantially no infrared light from a currently activated emitter.

28. The device as defined in claim 25, wherein said infrared emitters are disposed along an inner edge of said bezel and said infrared sensors are disposed along said inner edge and are optically aligned with a respective one of said emitters.

29. A touch screen for a video monitor for producing inputs signals to an electronic device connected to the monitor, comprising:

a bezel for surrounding a viewing screen of a video monitor;

a plurality of light emitters mounted on said bezel for generating a grid of light beams in front of the screen of the monitor;

activating means coupled to said light emitters for activating said light emitters in a predetermined sequence;

a plurality of light sensors mounted on said bezel oppositely disposed from respective one of said light emitters for sensing the presence and absence of respective light beams in said grid and producing output signals corresponding to the presence and absence, respectively, of the light beams;

scanning means coupled to said sensors for scanning said sensors in a sequence corresponding to and lagging behind said predetermined sequence so that a currently scanned sensor scans a previously activated emitter; and communication means for communicating the output signals of the scanned sensors to an electronic device connected to the monitor.

* * * * *